United States Patent
Kageyama et al.

(10) Patent No.: US 10,170,081 B2
(45) Date of Patent: Jan. 1, 2019

(54) IMAGE CORRECTION DEVICE AND VIDEO CONTENT REPRODUCTION DEVICE

(71) Applicant: SOCIONEXT INC., Kanagawa (JP)

(72) Inventors: Atsuhisa Kageyama, Osaka (JP); Kazutoshi Funahashi, Osaka (JP); Shotaro Itakura, Osaka (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 15/418,478

(22) Filed: Jan. 27, 2017

(65) Prior Publication Data

US 2017/0140734 A1  May 18, 2017

Related U.S. Application Data

(63) Continuation of application No. PCT/JP2015/003473, filed on Jul. 9, 2015.

(30) Foreign Application Priority Data

Jul. 30, 2014 (JP) .................................. 2014-155139
Aug. 7, 2014 (JP) .................................. 2014-161572

(51) Int. Cl.
*G06T 11/00* (2006.01)
*G06K 9/46* (2006.01)
(Continued)

(52) U.S. Cl.
CPC ........... *G09G 5/10* (2013.01); *G06K 9/00671* (2013.01); *G06K 9/4652* (2013.01); *G06T 5/00* (2013.01);
(Continued)

(58) Field of Classification Search
CPC combination set(s) only.
See application file for complete search history.

(56) References Cited

U.S. PATENT DOCUMENTS 6,160,576 A    12/2000  Higuchi et al.
6,215,961 B1 *  4/2001  Mukai ................. G03B 7/08
                                                     396/100
(Continued)

FOREIGN PATENT DOCUMENTS

CN    101034542 A    9/2007
JP    09-097333 A    4/1997
(Continued)

OTHER PUBLICATIONS

Masataka Okabe et al., (2002), "Color vision diversity and presentation free of color vision barrier", Cell engineering vol. 21, No. 8, pp. 909-930; with partial English translation.
(Continued)

*Primary Examiner* — Wesner Sajous
(74) *Attorney, Agent, or Firm* — McDermott Will & Emery LLP

(57) ABSTRACT

An image correction device generates a corrected image for a viewer with low vision, by adding excessive emphasis which reduces image quality as perceived by a viewer having normal eyesight, to at least one of luminance gradation, luminance contour, and color tone of a pre-correction image. The image correction device includes: a controller which specifies, in a low vision mode which is an image correction mode for the viewer with low vision, a parameter that represents an amount of correction greater than an upper limit of an amount of correction which does not reduce the image quality as perceived by the viewer having normal eyesight when the pre-correction image is corrected; and an image processor which generates the corrected image by correcting the at least one of the luminance gradation, the luminance contour, and the color tone of the pre-correction image with the amount of correction represented by the parameter.

24 Claims, 17 Drawing Sheets

(51) Int. Cl.
*G09G 5/02* (2006.01)
*G09G 5/10* (2006.01)
*G09G 5/00* (2006.01)
*G06K 9/00* (2006.01)
*G06T 5/00* (2006.01)

(52) U.S. Cl.
CPC .................. *G09G 5/00* (2013.01); *G09G 5/02* (2013.01); *G06K 9/4647* (2013.01); *G09G 2320/0626* (2013.01); *G09G 2320/0666* (2013.01); *G09G 2320/08* (2013.01)

(56) References Cited

U.S. PATENT DOCUMENTS

| | | |
|---|---|---|
| 6,272,071 B1 | 8/2001 | Takai et al. |
| 2013/0201496 A1 | 8/2013 | Boggs et al. |
| 2013/0342759 A1* | 12/2013 | Sahashi ............ H04N 5/268 348/460 |
| 2014/0267284 A1* | 9/2014 | Blanche ............ H04N 13/0402 345/428 |

FOREIGN PATENT DOCUMENTS

| | | |
|---|---|---|
| JP | 09-247563 A | 9/1997 |
| JP | 11-119638 A | 4/1999 |
| JP | 11-285022 A | 10/1999 |
| JP | 2005-039675 A | 2/2005 |
| JP | 2009-025761 A | 2/2009 |
| JP | 2011-134203 A | 7/2011 |

OTHER PUBLICATIONS

Toyohiko Hatada et al., (2007), "Eyes, color, and light, in pursuit of more excellent color reproduction", Japan Association of Graphic Arts Technology, p. 5; with English translation.

Hiroshi Sasaki, "Prevalence of Cataract", Ophthalmology, vol. 55, No. 3, 2013, p. 228, FIG1; with English translation.

Tomoaki Nakano, Yasuo Sakaguchi, Kazunori Higuchi, Kazuhiko Sugiyama, Shin Yamamoto, "Navigation-yo Display no Atarashii Hyoji Gijutsu", Gekkan Display, Kabushiki Kaisha Techno Times Sha, Aug. 1, 1999 (Aug. 1, 1999),; vol. 5, No. 8, pp. 27 to 32, ISSN 1341-3961, particularly, p. 29, right column, line 1 to p. 31, left column, line 12; with partial English translation; cited in the ISR.

Kazunori Higuchi, Tomoaki Nakano, Shin Yamamoto, "Simulating Vision of Older People for the Design of On-board Visual Displays", The Transactions of The Institute of Electrical Engineers of Japan. C, Dec. 20, 1996 (Dec. 20, 1996), vol. 117-C, No. 1, pp. 27 to 34, ISSN 0385-4221; with partial English translation; cited in the ISR.

International Search Report (ISR) dated Oct. 13, 2015 in International (PCT) Application No. PCT/JP2015/003473; with English translation.

Written Opinion of the International Searching Authority dated Oct. 13, 2015 in International Application No. PCT/JP2015/003473; with partial English translation.

First Notice of Reasons for Refusal issued in corresponding Chinese Application No. 2015800416024 dated Aug. 17, 2018 (with English translation).

* cited by examiner

FIG. 2

| Correction function | Configuration variable name | STD | LVN1 | LVN2 | LVN3 |
|---|---|---|---|---|---|
| Histogram adaptive gradation correction | HISTEFFECT | 0.05 | 0.2 | 0.4 | 0.6 |
| Average luminance adaptive gradation correction | APLEFFECT | 1.0 | 1.2 | 1.6 | 2.0 |
| Luminance contour correction | SHARPGAIN | 0.2 | 0.5 | 1.0 | 1.5 |
| Total color saturation correction | SATGAIN | 1.0 | 1.1 | 1.15 | 1.2 |
| Total color lightness correction | VALGAIN | 1.0 | 1.1 | 1.2 | 1.3 |
| Specific color hue correction | HUEANGLE | 5° | -10° | -15° | -20° |
| Specific color saturation correction | SSATGAIN | 1.0 | 1.1 | 1.2 | 1.3 |
| Specific color lightness correction | SVALGAIN | 1.0 | 1.1 | 1.2 | 1.3 |

FIG. 14

| Better | Worse | No difference |
|--------|-------|---------------|
| 12     | 2     | 1             |

IMAGE CORRECTION DEVICE AND VIDEO CONTENT REPRODUCTION DEVICE

CROSS REFERENCE TO RELATED APPLICATIONS

This is a continuation application of PCT International Application No. PCT/JP2015/003473 filed on Jul. 9, 2015, designating the United States of America, which is based on and claims priorities of Japanese Patent Applications No. 2014-155139 filed on Jul. 30, 2014 and No. 2014-161572 filed on Aug. 7, 2014. The entire disclosures of the above-identified applications, including the specifications, drawings and claims are incorporated herein by reference in their entirety.

FIELD

The present disclosure relates to an image correction device and a video content reproduction device, and particularly to a technique for performing appropriate image correction for a viewer with low vision.

BACKGROUND

Conventionally, a technique for performing image correction more appropriate for people having decreased visual characteristics (also referred to as low vision) compared to people having normal visual characteristics has been under consideration. The causal factors of the decreased visual characteristics include, for example, an age-related cataract, diabetic retinopathy, and age-related macular degeneration.

For example, one known technique includes a technique which causes a luminance signal level to non-linearly change according to an average luminance level of an image, for forming a bright and clear picture in image reproduction appropriate for the visual characteristics of elderly people (for example, Patent Literature (PLT) 1).

PLT 1 describes a technique which uses, as gain characteristics, a plurality of S-shaped curves having different shapes according to an average luminance when correcting a luminance gradation, and thereby expanding the luminance gradation to a greater degree in a middle luminance range and compressing the luminance gradations to a greater degree in a low luminance range and a high luminance range as the average luminance decreases.

Another known technique is, for example, a technique which increases the luminance of a specific color for a viewer with cataract (for example, PLT 2).

PLT 2 describes a technique which performs correction of increasing luminance of blue or increasing luminance of blue and green, according to the level of progress of cataract of a viewer.

CITATION LIST

Patent Literature

[PLT 1] Japanese Unexamined Patent Application Publication No. 09-247563

[PLT 2] Japanese Unexamined Patent Application Publication No. 2009-25761

SUMMARY

Technical Problem

However, there is a problem that, even with these techniques, there might be the case where an image quality as perceived by a viewer with low vision is not sufficiently improved.

The present disclosure has been conceived in view of such a problem, and an object of the present disclosure is to provide an image correction device and a video content reproduction device which perform appropriate image correction for a viewer with low vision.

Solution to Problem

In order to achieve the above-described object, an image correction device according to an aspect of the present disclosure is an image correction device which generates a corrected image for a viewer with low vision, by adding excessive emphasis which reduces image quality as perceived by a viewer having normal eyesight, to at least one of luminance gradation, luminance contour, and color tone of a pre-correction image.

It should be noted that these generic and specific aspects may be implemented using a system, a method, an integrated circuit, a computer program, or a non-transitory computer-readable recording medium such as a compact disc read only memory (CD-ROM), and may also be implemented by any combination of systems, methods, integrated circuits, computer programs, and recording media.

Advantageous Effects

With an image correction device according to an aspect of the present disclosure, since excessive emphasis which reduces image quality as perceived by a viewer having normal eyesight is added to a pre-correction image, it is possible to perform image correction with an amount of correction sufficient for improving image quality as perceived by a viewer with low vision.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 is a diagram which illustrates an example of a parameter according to Embodiment 1.

FIG. 14 is a diagram which illustrates an example of a result of a field test of the digital television receiver according to Embodiment 2.

DESCRIPTION OF EMBODIMENTS (Underlying Knowledge Forming Basis of the Present Disclosure)

The inventors have found the following problems related to the method disclosed by conventional techniques described in the "Background" section.

With the technique described in PLT 1, since the gradation in the low luminance range is compressed using the S-shaped curve as the gain characteristics, black crushing, as it is called, is likely to occur. The black crushing is a phenomenon that luminance in a dark area in a corrected image cannot be distinguished. The black crushing is more likely to be perceived by a viewer with low vision whose visual sensitivity is decreased than a viewer having normal eyesight, and thus another technique of correcting gradation appropriate for the viewer with low vision is necessary.

In addition, according to the technique described in PLT 2, even if luminance of a specific color is increased, it is not possible to exceed the upper limit of a range of a luminance value. For that reason, for a viewer with low vision who cannot obtain sufficient improvement in image quality by correcting the luminance of blue or the luminance of blue and green, another appropriate color correction technique other than the correction of the luminance value is required.

Furthermore, other than the particular problems as described above, the image correction for a viewer with low vision has the following general problems.

The degree of image correction appropriate for a viewer with low vision has not been sufficiently considered on the basis of, for example, comparison with the degree of image correction performed for a viewer having normal eyesight.

In addition, a systematic configuration for performing overall image correction including correction of luminance gradation and correction of color tone integrally at any of the degree appropriate for a viewer having normal eyesight and the degree appropriate for a viewer with low vision has not been disclosed.

The inventors have earnestly investigated an image correction device which performs image correction appropriate for a viewer with low vision, aiming to overcome the above-described problems of conventional techniques. In this investigation, several documents related to visual characteristics of a viewer with low vision have been studied.

Figure 16:
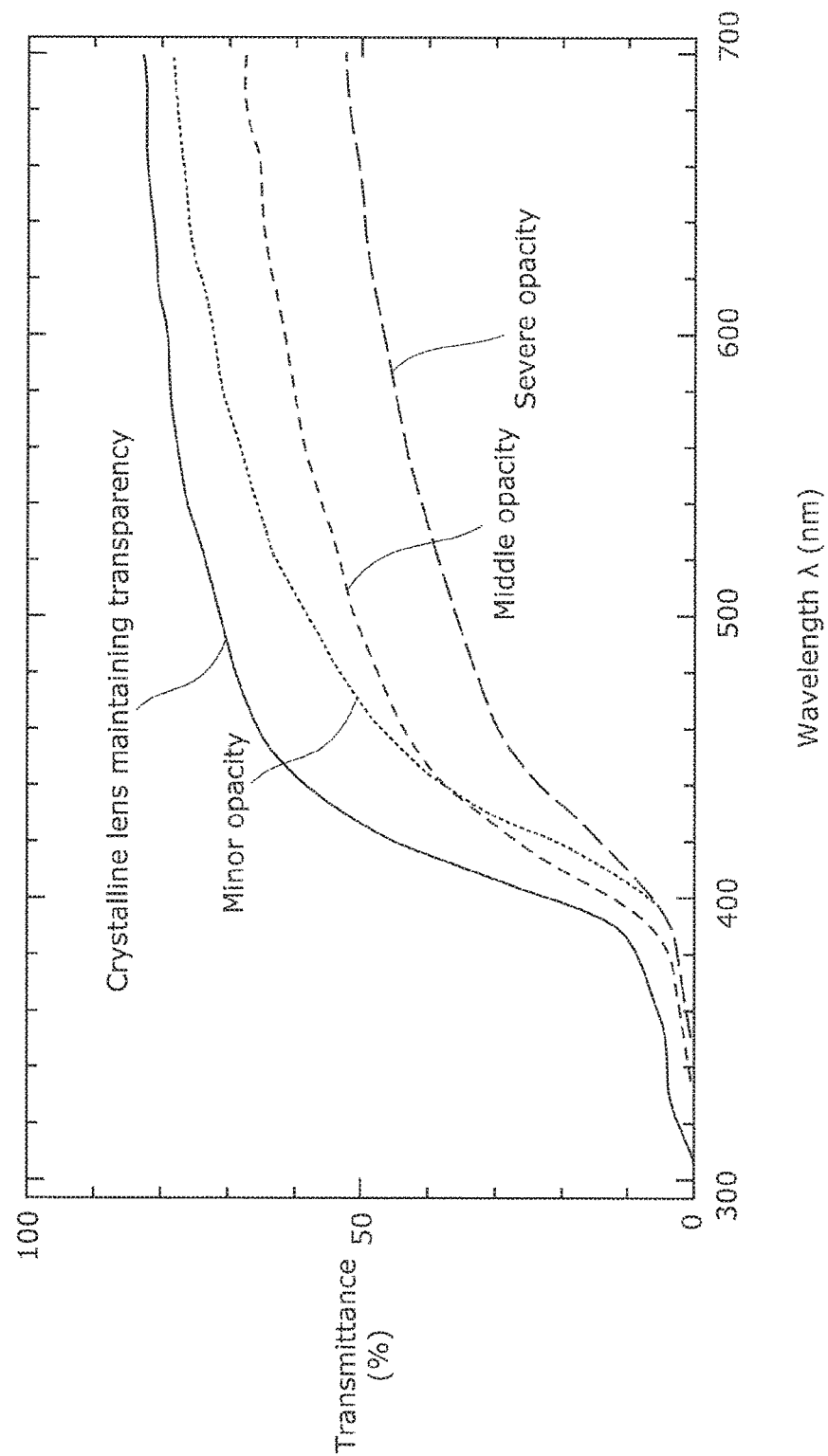
FIG. 16 is a graph which illustrates a spectral transmittance of human crystalline lens extracapsular extraction nucleus, according to the degree of opacity.

FIG. 16 illustrates a graph which indicates, for each degree of opacity, spectral transmittance of human crystalline lens extracapsular extraction nucleus (Non Patent Literature 1: Masataka Okabe et al., (2002), "Color vision diversity and presentation free of color vision barrier", Cell engineering Vol. 21, No. 8, pages 909-930). FIG. 16 illustrates a result of measurement using a section of crystalline lens nucleus extracted by cataract operation.

Figure 17A:
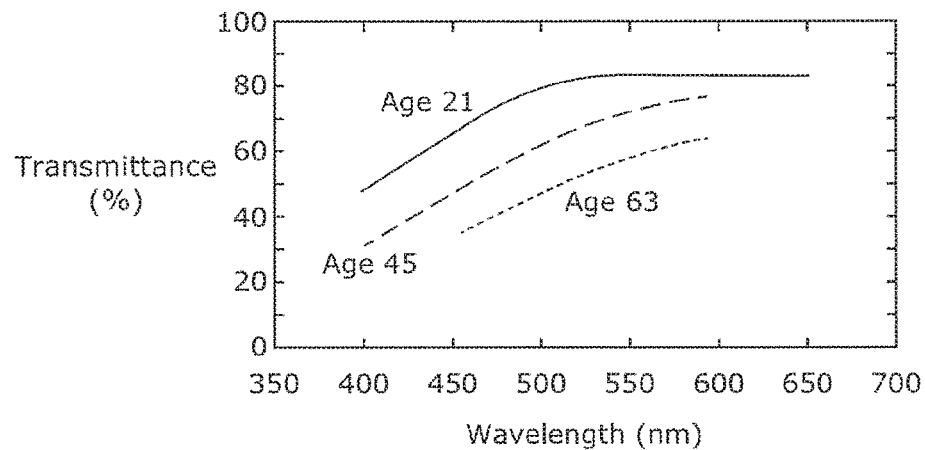
FIG. 17A is a graph which illustrates changes of the spectral transmittance of an eyeball due to aging.
Figure 17B:
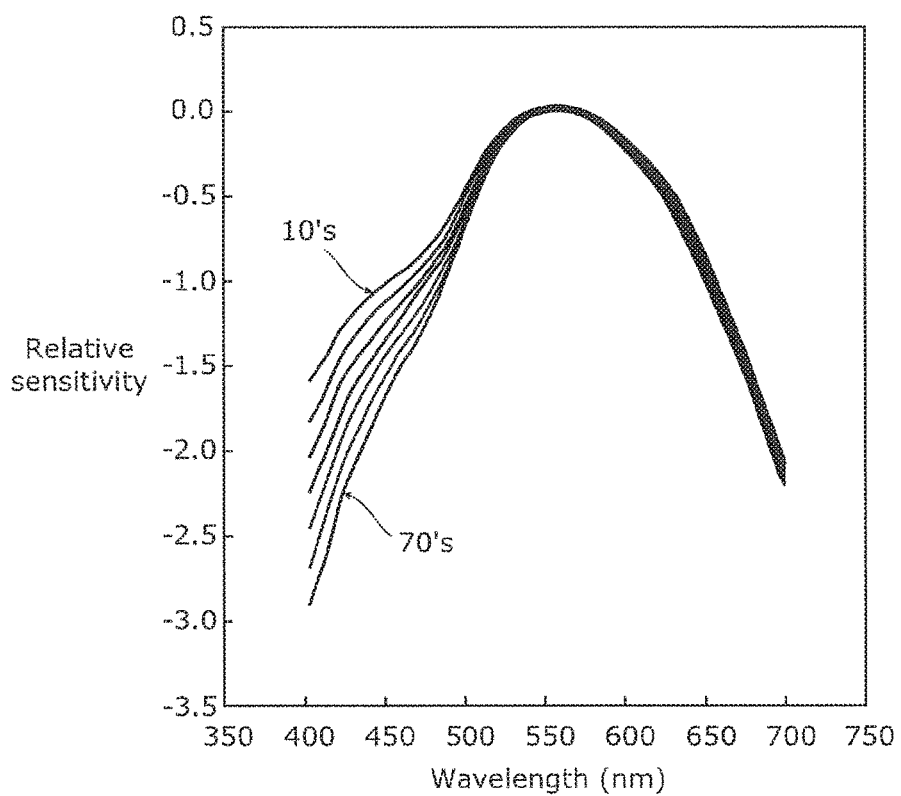
FIG. 17B is a graph which illustrates changes of relative visibility due to aging.

FIG. 17A and FIG. 17B are graphs indicating changes of spectral transmittance of an eyeball due to aging and changes of relative visibility due to aging, respectively (Non Patent Literature 2: Toyohiko Hatada et al., (2007), "Eyes, color, and light, in pursuit of more excellent color reproduction", Japan Association of Graphic Arts Technology, page 5). FIG. 17A and FIG. 17B indicate that the spectral transmittance of the crystalline lens shows changes similar to the progress of cataract, and that the relative visibility with respect to light in a short wavelength range is significantly decreased.

On the basis of these studies, the state of having decreased visual characteristics compared to a person having normal eyesight is defined as low vision regardless of an occurrence factor. The occurrence factors of low vision include, for example, illnesses and aging, and cataract, diabetic retinopathy, age-related macular degeneration, etc., may be included in the illnesses. Discrimination between normal eyesight and low vision may be performed, for example, according to whether or not the spectral transmittance of an eyeball with respect to blue light having a wavelength of 435 nm is greater than or equal to 35%, based on FIG. 16 and FIG. 17A.

The inventors carried out an experiment in which the inventors wore goggles for simulating cataract and actually corrected a test image. The goggles have a spectral absorption index corresponding to the difference between spectral transmittance of a normal eyeball and spectral transmittance of an eyeball having cataract, and provide a wearer having normal eyesight with simulated eyesight of a person who has cataract.

In this experiment, the inventors tested correction on at least one of the luminance gradation, the luminance contour, and the color tone of the test image with various amounts of correction while wearing the goggles, and thereby searched an amount of correction appropriate for improving an image quality (subjective brightness, contrast, sharpness, vividness, etc.) as perceived by a viewer with low vision. In addition, the inventors the inventors tested correction on at least one of the luminance gradation, the luminance contour, and the color tone of the test image with various amounts of correction while not wearing the goggles, and thereby searched an amount of correction appropriate for improving the image quality as perceived by a viewer having normal eyesight.

As a result of the experiment, the image quality as perceive by the viewer with low vision was not improved when the test image was corrected with the amount of correction appropriate for the viewer having normal eyesight. In addition, when the test image was corrected with a great amount of correction significantly exceeding the amount of correction appropriate for the viewer having normal eyesight, the image quality as perceived by the viewer with low vision was improved, and thus the amount of correction appropriate for the viewer with low vision was successfully found. Furthermore, it was found out that the test image corrected with the amount of correction appropriate for the viewer with low vision includes excessive emphasis which reduces the image quality as perceived by the viewer having normal eyesight.

The inventors have conceived an image correction device disclosed below, on the basis of the above-described knowledge.

An image correction device according to an aspect of the present disclosure generates a corrected image for a viewer with low vision, by adding excessive emphasis which reduces image quality as perceived by a viewer having normal eyesight, to at least one of luminance gradation, luminance contour, and color tone of a pre-correction image.

In this manner, since excessive emphasis which reduces image quality as perceived by a viewer having normal eyesight is added to a pre-correction image, it is possible to perform image correction with an amount of correction necessary for improving image quality as perceived by a viewer with low vision.

For example, the image correction device may include: a controller which specifies, in a low vision mode which is an image correction mode for the viewer with low vision, a parameter that represents an amount of correction greater than an upper limit of an amount of correction which does not reduce the image quality as perceived by the viewer having normal eyesight when the pre-correction image is corrected; and an image processor which generates the corrected image by correcting the at least one of the luminance gradation, the luminance contour, and the color tone of the pre-correction image with the amount of correction represented by the parameter.

In this manner, it is possible to perform image correction with an amount of correction necessary for improving image quality as perceived by a viewer with low vision, by the image processor as a result of specifying a parameter by the controller.

For example, in the low vision mode, the image processor may generate the corrected image by correcting a portion of the pre-correction image using the amount of correction specified by the controller, and correcting a remainder of the pre-correction image using an amount of correction less than the amount of correction specified by the controller.

In this manner, it is possible to perform image correction appropriate for a viewer with low vision who has decreased visual characteristics in part of a visual field.

For example, in the low vision mode, the image processor may combine, with the corrected image, a specific image or a character which indicates that correction for the viewer with low vision has been applied.

In this manner, it is possible for a viewer having normal eyesight to know that the image is corrected in the low vision mode, by viewing the specific image or character.

For example, the controller may select one of a plurality of image correction modes as the low vision mode, and specify, as the amount of correction, an amount of correction which differs according to the one of the plurality of image correction modes that has been selected, and is greater than the upper limit.

In this manner, it is possible to selectively perform image correction appropriate for a plurality of viewers with low vision who have decreased visual characteristics at different degrees.

For example, the controller may select one of the low vision mode and a standard mode which is an image correction mode for the viewer having normal eyesight, and specify an amount of correction equal to or less than the upper limit, in the standard mode.

In this manner, it is possible to implement the image correction device as a device of a general purpose which selectively performs image correction in the low vision mode and image correction in the standard mode.

For example, the image processor may include a gradation corrector which corrects the luminance gradation of the pre-correction image. The gradation corrector may include: a histogram detector which counts, in each of N sections obtained by dividing a range of a pre-correction luminance value related to luminance of a plurality of pixels included in the pre-correction image, a frequency HIST(i) which is the number of pixels each having the pre-correction luminance value included in an i-th section, N being ≥2, i being 1 to N; a gain characteristics generator which receives a magnifying value HISTEFFECT which has been specified, and generates, using a value HIST_AVE which is an average value of the frequency HIST(i), a polygonal line having a gradient of $(1+(HIST(i)/HIST\_AVE-1) \times HISTEFFECT)$ in the i-th section, as gain characteristics representing correspondence between the pre-correction luminance value and a corrected luminance value; and a converter which converts the pre-correction luminance value into the corrected luminance value associated with the pre-correction luminance value according to the gain characteristics. The controller may specify, as the magnifying value HISTEFFECT, a value less than or equal to 0.05 in the standard mode, and a value greater than or equal to 0.2 in the low vision mode, to the gradation corrector.

In this manner, it is possible to perform the histogram adaptive gradation correction appropriate for a viewer with low vision.

For example, the image processor may include a gradation corrector which corrects the luminance gradation of the pre-correction image. The gradation corrector may include: an average luminance detector which detects an average luminance APL of a pre-correction luminance value related to luminance of a plurality of pixels included in the pre-correction image; a gain characteristics generator which receives a magnifying value APLEFFECT which has been specified, and generates a polygonal line, using: an adjustment value GA(i) for each of N sections obtained by dividing a range of the pre-correction luminance value; and an adjustment coefficient ALPHA represented by a function of the average luminance APL, the polygonal line having a gradient of $(1+(GA(i)-1) \times ALPHA \times APLEFFECT)$ in an i-th section, as gain characteristics representing correspondence between the pre-correction luminance value and a corrected luminance value, N being ≥2, i being 1 to N, $\Sigma GA(i)$ being N; and a converter which converts the pre-correction luminance value into the corrected luminance value associated with the pre-correction luminance value according to the gain characteristics. The controller may specify, as the magnifying value APLEFFECT, a value less than or equal to 1.0 in the standard mode, and a value greater than or equal to 1.2 in the low vision mode, to the gradation corrector.

In this manner, it is possible to perform the average luminance adaptive gradation correction appropriate for a viewer with low vision.

For example, the image processor may include a contour corrector which corrects the luminance contour of the pre-correction image. The contour corrector may include: a contour extractor which extracts a contour component related to luminance of the pre-correction image; and a calculator which receives a magnifying value SHARPGAIN which has been specified, and calculate a corrected luminance value by adding a contour correction component to a pre-correction luminance value related to luminance of a plurality of pixels included in the pre-correction image, the contour correction component being obtained by multiplying the contour component by the magnifying value SHARPGAIN. The controller may specify, as the magnifying value SHARPGAIN, a value less than or equal to 0.2 in the standard mode, and a value greater than or equal to 0.5 in the low vision mode, to the contour corrector.

In this manner, it is possible to perform the luminance contour correction appropriate for a viewer with low vision.

For example, the image processor may include a color corrector which corrects the color tone of the pre-correction image. The color corrector may include a total color corrector which receives a magnifying value SATGAIN which has been specified, and calculate a corrected saturation value by multiplying, by the magnifying value SATGAIN, a pre-correction saturation value related to saturation of each of a plurality of pixels included in the pre-correction image. The controller may specify, as the magnifying value SATGAIN, a value less than or equal to 1.0 in the standard mode, and a value greater than or equal to 1.1 in the low vision mode, to the total color corrector.

In this manner, it is possible to perform the total color saturation correction appropriate for a viewer with low vision.

For example, the image processor may include a color corrector which corrects the color tone of the pre-correction image. The color corrector may include a total color corrector which receives a magnifying value VALGAIN which has been specified, and calculate a corrected lightness value by multiplying, by the magnifying value VALGAIN, a pre-correction lightness value related to lightness of each of a plurality of pixels included in the pre-correction image. The controller may specify, as the magnifying value VALGAIN, a value less than or equal to 1.0 in the standard mode, and a value greater than or equal to 1.1 in the low vision mode, to the total color corrector.

In this manner, it is possible to perform the total color lightness correction appropriate for a viewer with low vision.

For example, the image processor may include a color corrector which corrects the color tone of the pre-correction image. The color corrector may include a specific color corrector which receives an angle value HUEANGLE which has been specified, and calculates, for each of a plurality of pixels included in the pre-correction image, a corrected hue value by adding the angle value HUEANGLE to a pre-correction hue value related to a hue of each of the pixels when the pre-correction hue value falls in a specific range. The controller may specify, as the angle value HUEANGLE, a value less than or equal to 5 degrees in an absolute value in the standard mode, and a value greater than or equal to 10 degrees in an absolute value in the low vision mode, to the specific color corrector.

In this manner, it is possible to perform the specific color hue correction appropriate for a viewer with low vision.

For example, the image processor may include a color corrector which corrects the color tone of the pre-correction image. The color corrector may include a specific color corrector which receives a magnifying value SSATGAIN which has been specified, and calculates, for each of a plurality of pixels included in the pre-correction image and each having a pre-correction hue value that is related to a hue of the pixel and falls in a specific range, a corrected saturation value by multiplying, by the magnifying value SSATGAIN, a pre-correction saturation value related to saturation of the pixel. The controller may specify, as the magnifying value SSATGAIN, a value less than or equal to 1.0 in the standard mode, and a value greater than or equal to 1.1 in the low vision mode, to the specific color corrector.

In this manner, it is possible to perform the specific color saturation correction appropriate for a viewer with low vision.

For example, the image processor may include a color corrector which corrects the color tone of the pre-correction image. The color corrector may include a specific color corrector which receives a magnifying value SVALGAIN which has been specified, and calculates, for each of a plurality of pixels included in the pre-correction image and each having a pre-correction hue value that is related to a hue of the pixel and falls in a specific range, a corrected lightness value by multiplying, by the magnifying value SVALGAIN, a pre-correction lightness value related to lightness of the pixel. The controller may specify, as the magnifying value SVALGAIN, a value less than or equal to 1.0 in the standard mode, and a value greater than or equal to 1.1 in the low vision mode, to the specific color corrector.

In this manner, it is possible to perform the specific color lightness correction appropriate for a viewer with low vision.

It should be noted that these generic and specific aspects may be implemented using a system, a method, an integrated circuit, a computer program, or a non-transitory computer-readable recording medium such as a compact disc read only memory (CD-ROM), and may also be implemented by any combination of systems, apparatuses, methods, integrated circuits, computer programs, and recording media.

Hereinafter, an image correction device according to an aspect of the present disclosure shall be specifically described with reference to the Drawings.

It should be noted that embodiments described below each indicate one specific example of the present disclosure. The numerical values, shapes, materials, structural components, the arrangement and connection of the structural components, etc. shown in the following embodiments are mere examples, and therefore and do not intend to limit the present disclosure. Therefore, among the structural components in the following embodiments, structural components not recited in any one of the independent claims are described as arbitrary structural components.

Embodiment 1

Hereinafter, an image correction device according to Embodiment 1 shall be described with reference to the accompanying Drawings.

An image correction device according to Embodiment 1 is an image correction device which generates a corrected image for a viewer with low vision, by adding excessive emphasis which reduces image quality as perceived by a viewer having normal eyesight, to at least one of luminance gradation, luminance contour, and color tone of a pre-correction image. Such a mode of image correction is called a low vision mode.

The image correction device may further correct at least one of the luminance gradation, the luminance contour, and the color tone of the pre-correction image at a degree appropriate for a viewer having normal eyesight. Such a mode of image correction is called a standard mode.

The image correction device may be a dedicated device which performs image correction only in the low vision mode, or may be a general-purpose device which selectively performs image correction in the low vision mode and image correction in the standard mode.

Figure 1:
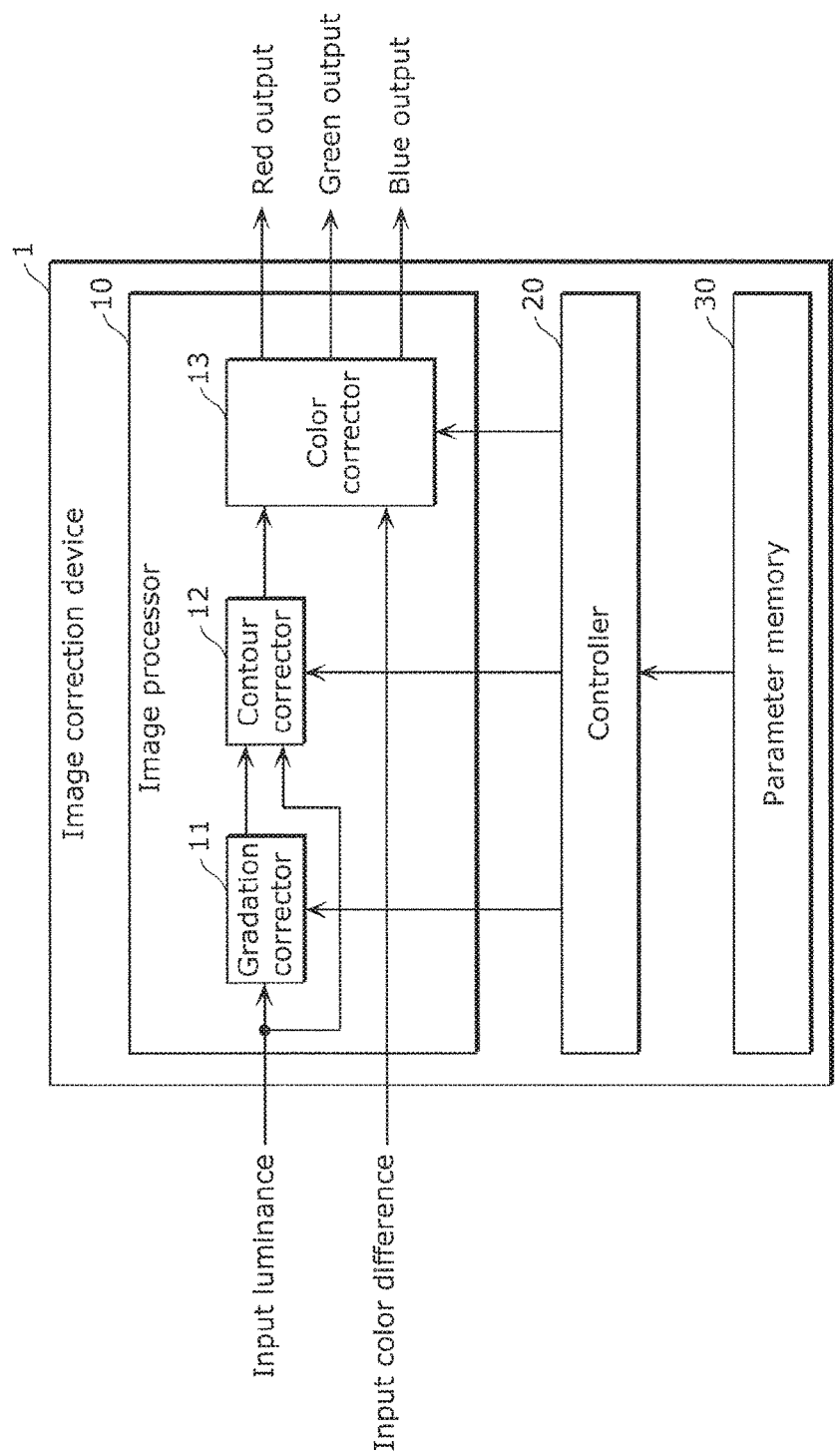
FIG. 1 is a block diagram which illustrates an example of a functional configuration of an image correction device according to Embodiment 1.

FIG. 1 is a block diagram which illustrates an example of a functional configuration of the image correction device according to the present embodiment. As illustrated in FIG. 1, an image correction device 1 includes an image processor 10, a controller 20, and a parameter memory 30.

The image processor 10 includes a gradation corrector 11, a contour corrector 12, and a color corrector 13, and generates a corrected image by correcting at least one of the luminance gradation, the luminance contour, and the color tone of a pre-correction image using a correction amount represented by a parameter specified by the controller 20. The pre-correction image may be represented by, for example, a luminance value and a color difference value. The corrected image may be represented by, for example, a color component value of each of red, green, and blue.

The controller 20 is a controller which specifies, in the low vision mode, a parameter that represents an amount of correction greater than an upper limit of an amount of correction which does not reduce image quality as perceived by a viewer having normal eyesight when the pre-correction image is corrected. The controller 20 may further specify, in the standard mode, a parameter that represents an amount of correction equal to or less than the upper limit.

The parameter memory 30 is a memory in which the amount of correction to be read and specified by the controller 20 is stored. It should be noted that the controller 20 may obtain a correction value from outside the image correction device 1 and specify the obtained correction value. In this case, the parameter memory 30 need not necessarily be included in the image correction device 1.

The configuration for implementing the image correction device 1 is not specifically limited. The image processor 10 and the controller 20 may be configured of, for example, a software function which is exercised by executing a predetermined program by a central processing unit (CPU) or a digital signal processor (DSP), a hardware circuit including a field programmable gate array (FPGA), an application specific integrated circuit (ASIC), or the like, or a combination of such a software function and a hardware circuit. In addition, the parameter memory 30 may be configured of, for example, a non-volatile memory such as a resistance random access memory (ReRAM), a magnetoresistive RAM (MRAM), a ferroelectric RAM (FeRAM), a flash memory, etc.

FIG. 2 is a diagram which illustrates an example of a parameter specified by the controller 20.

FIG. 2 illustrates a set of parameters STD each of which indicates an amount of correction in the standard mode, and sets of parameters LVN1, LVN2, and LVN3 each of which indicates amounts of correction in one of three levels including weak, middle, and strong in the low vision mode, for a correction function of each of the histogram adaptive gradation correction, the average luminance adaptive gradation correction, the luminance contour correction, the total color saturation correction, the total color lightness correction, the specific color hue correction, the specific color saturation correction, and the specific color lightness correction. Specific correction functions and examples of the amounts of correction will be described in detail below.

It should be noted that the amount of correction in the low vision mode is not limited to the tree levels. For example, in the low vision mode, only one level of the amount of correction may be used, or four or more levels of the amount of correction may be selectively used.

Figure 3:
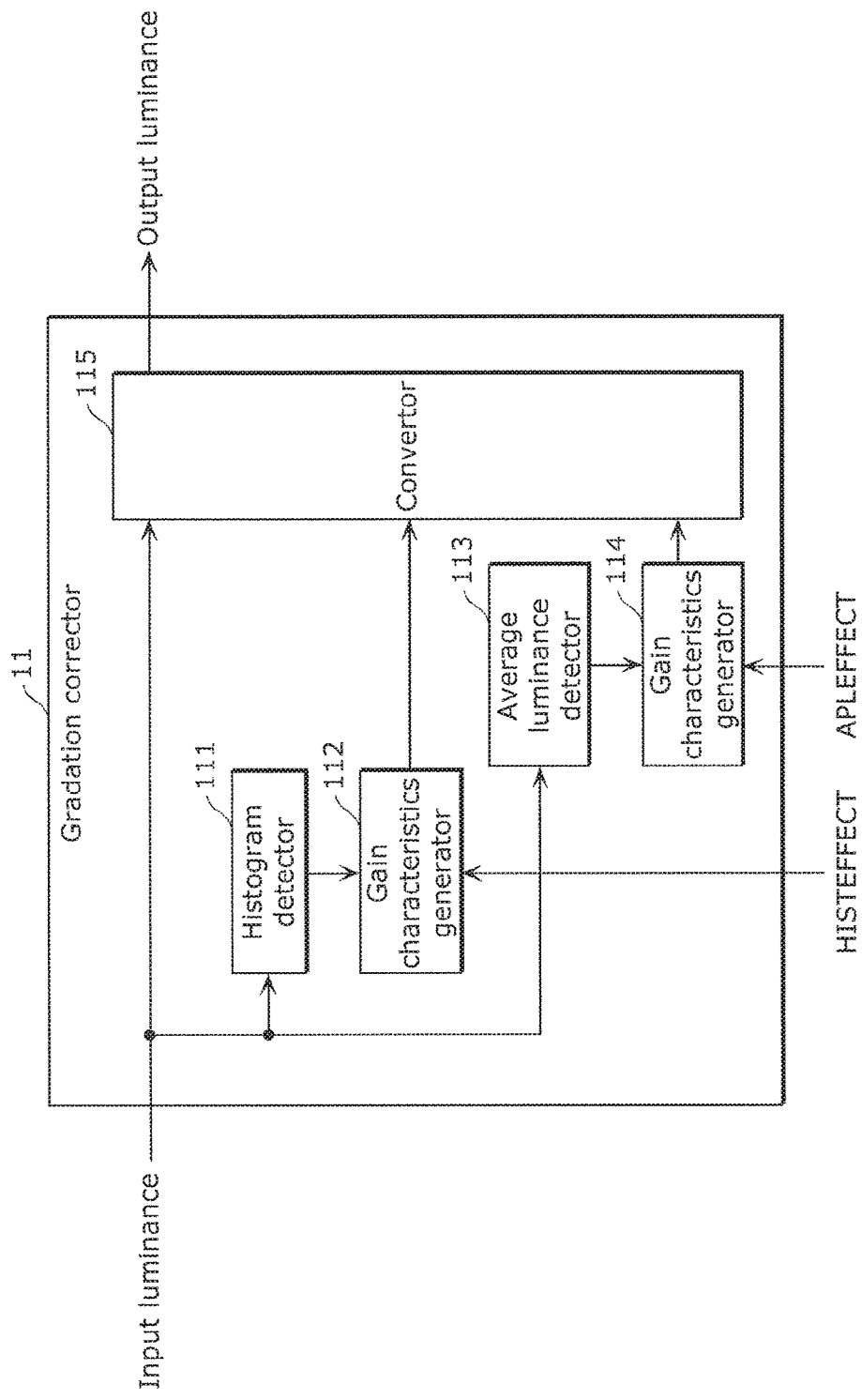
FIG. 3 is a block diagram which illustrates an example of a functional configuration of a gradation corrector according to Embodiment 1.

FIG. 3 is a block diagram which illustrates an example of a functional configuration of the gradation corrector 11. The gradation corrector 11 performs one of the histogram adaptive gradation correction and the average luminance adaptive gradation correction, or performs both of the histogram adaptive gradation correction and the average luminance adaptive gradation correction. As illustrated in FIG. 3, the gradation corrector 11 includes: a histogram detector 111; a gain characteristics generator 112; an average luminance detector 113; a gain characteristics generator 114; and a convertor 115.

The following describes the histogram adaptive gradation correction performed by the gradation corrector 11.

Figure 4:
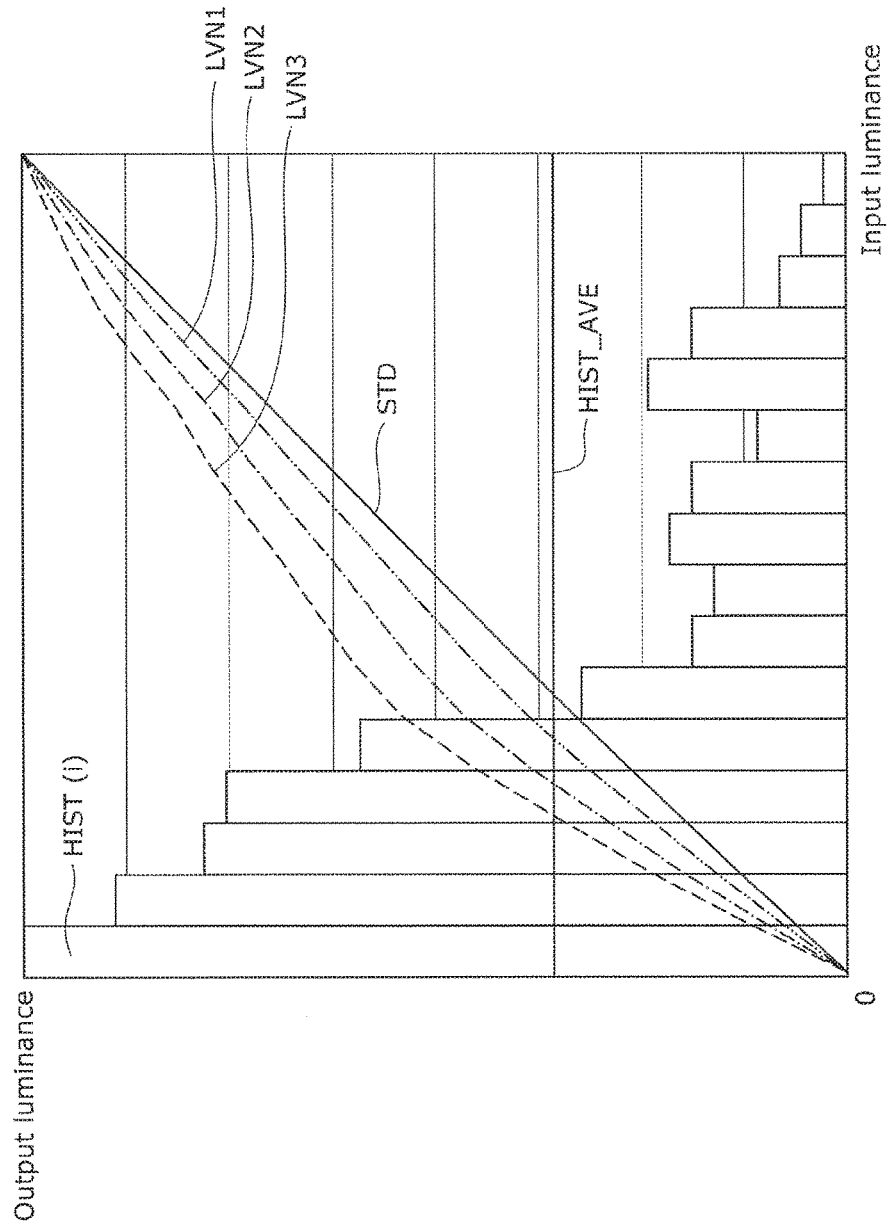
FIG. 4 is a diagram which illustrates an example of histogram adaptive gradation correction according to Embodiment 1.

FIG. 4 is a diagram which illustrates an example of the histogram adaptive gradation correction.

The histogram detector 111 counts, in each of N sections ($N \geq 2$) obtained by dividing a range of a pre-correction luminance value related to luminance of a plurality of pixels included in the pre-correction image, a frequency HIST(i) (i=1 to N) which is the number of pixels each having the pre-correction luminance value included in an i-th section.

In the example of FIG. 4, the frequency HIST(i) is counted in 16 sections obtained by dividing the range of the luminance values into 16 equal portions.

The gain characteristics generator 112 receives a magnifying value HISTEFFECT which has been specified, and generates, using a value HIST_AVE which is an average value of the frequency HIST(i), a polygonal line having a gradient of (1+(HIST(i)/HIST_AVE−1)×HISTEFFECT) in the i-th section, as gain characteristics representing correspondence between the pre-correction luminance value and the corrected luminance value.

In the example of FIG. 4, polygonal lines STD, LVN1, LVN2, and LVN3 which are generated to correspond to magnifying values HISTEFFECT of 0.05, 0.2, 0.4, and 0.6, respectively.

The converter 115 converts the pre-correction luminance value into the corrected luminance value which is associated with the pre-correction luminance value according to the gain characteristics generated by the gain characteristics generator 112.

Here, the polygonal line generated to correspond to the positive magnifying value HISTEFFECT has a shape in which a gradient for each of the sections of the polygonal line representing accumulated frequency distribution of the HIST(i) (hereinafter referred to as an accumulated frequency polygonal line) is increased according to the magnifying value HISTEFFECT in a section having a frequency greater than an average value, and decreased according to the magnifying value HISTEFFECT in a section having a frequency less than the average value. Such a shape of the polygonal line corresponds to a shape resulting from emphasizing or suppressing the meander shape of the accumulated frequency polygonal line according to the magnifying value HISTEFFECT.

A luminance value is corrected according to the gain characteristics represented by the polygonal line having a shape corresponding to the accumulated frequency polygonal line, and thereby contrast in a section with a luminance value having a great frequency is expanded, and contrast in a section with a luminance value having a small frequency is compressed. Accordingly, the gradation representation of a corrected image perceived by a viewer is improved. In particular, the gain characteristics represented by a polygonal line having a shape corresponding to the accumulated frequency polygonal line is used when correcting an image in which a luminance value having a frequency which leans to a low luminance range, and thus contrast in the low luminance range is expanded, unlike conventional techniques in which contrast in the middle luminance range is expanded by using gain characteristics having an S-shape. Accordingly, black crushing is less perceivable. The degree of expanding or compressing the contrast for each of the luminance sections; that is, the amount of correction of the luminance value is adjustably controlled according to the degree of meandering of the shape of the polygonal line representing the gain characteristics.

In the histogram adaptive gradation correction, the gain characteristics represented by a polygonal line having a shape in which a meander shape of the accumulated frequency polygonal line is emphasized or suppressed according to the above-described unique expression. For that reason, only by changing the magnifying value HISTEFFECT that is specified, it is possible to perform gradation correction integrally, with an extensive and adjustable amount of correction which covers from an amount of correction appropriate for a viewer having normal eyesight to an amount of correction appropriate for a viewer with a low vision.

The gradation corrector 11 may perform an average luminance adaptive gradation correction instead of the histogram adaptive gradation correction, or in combination with the histogram adaptive gradation correction.

The following describes the average luminance adaptive gradation correction performed by the gradation corrector 11.

Figure 5:
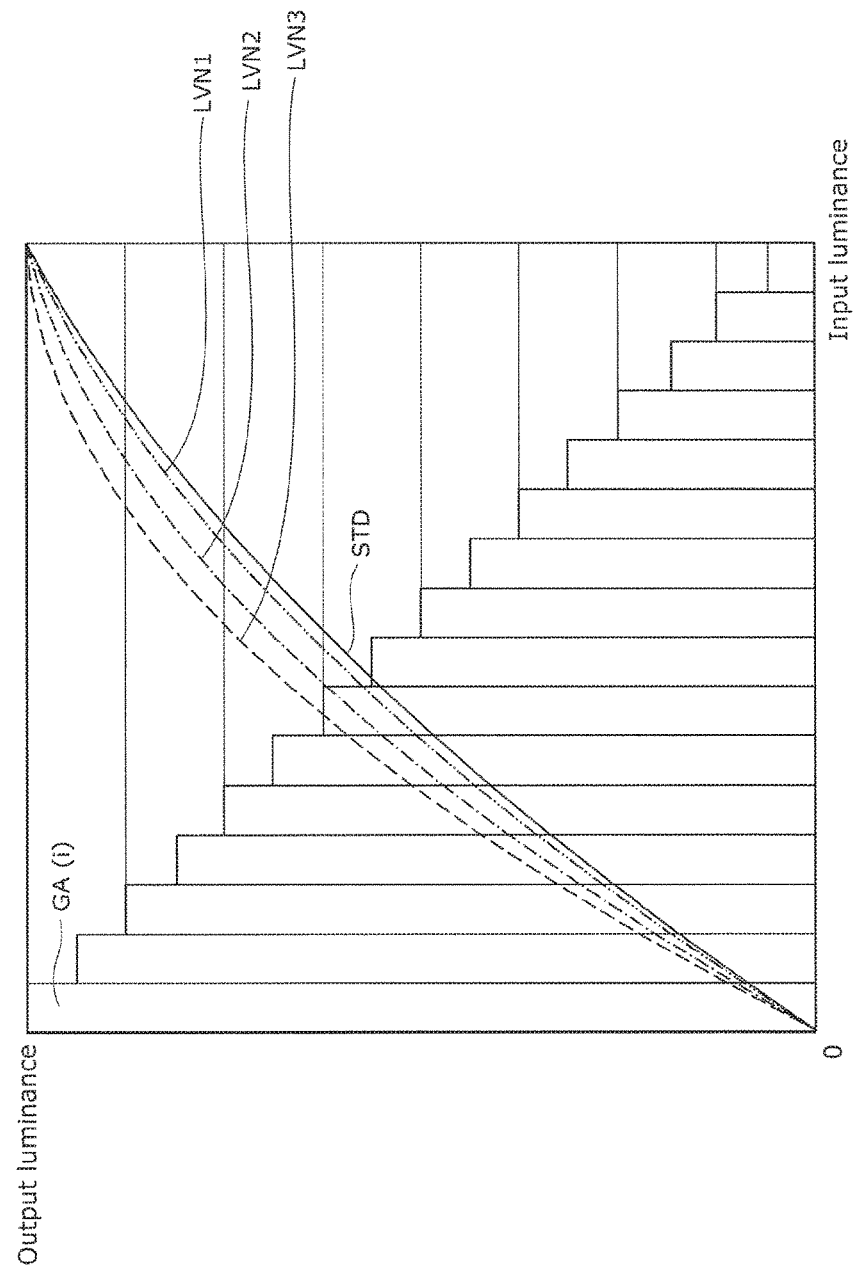
FIG. 5 is a diagram which illustrates an example of average luminance adaptive gradation correction according to Embodiment 1.

FIG. 5 is a diagram which illustrates an example of the average luminance adaptive gradation correction.

Figure 6:
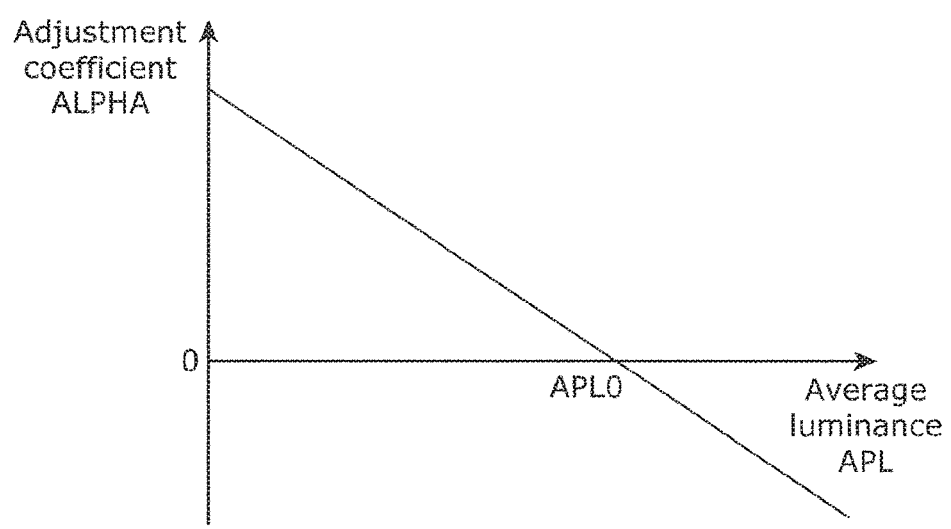
FIG. 6 is a graph which illustrates an example of an adjustment coefficient according to Embodiment 1.

FIG. 6 is a graph which illustrates an example of an adjustment coefficient used in the average luminance adaptive gradation correction.

The average luminance detector 113 detects an average luminance APL which is an average value of a pre-correction luminance value related to luminance of a plurality of pixels included in a pre-correction image.

The gain characteristics generator 114 receives a magnifying value APLEFFECT which has been specified, and generates a polygonal line, using: an adjustment value $GA(i)$ ($i=1$ to N and $\Sigma GA(i)=N$) for each of N sections ($N \geq 2$) obtained by dividing a range of the pre-correction luminance value; and an adjustment coefficient ALPHA represented by a function of the average luminance APL. The polygonal line has a gradient of $(1+(GA(i)-1) \times ALPHA \times APLEFFECT)$ in the i-th section, as gain characteristics representing correspondence between the pre-correction luminance value and the corrected luminance value.

In the examples illustrated in FIG. 5 and FIG. 6, the adjustment value $GA(i)$ which monotonically decreases and the adjustment coefficient ALPHA represented by a decreasing function of the average luminance APL are used, and polygonal lines STD, LVN1, LVN2, and LVN3 which are generated to correspond to the magnifying values APLEFFECT of 1.0, 1.2, 1.6, and 2.0, respectively, are illustrated, when a value of the adjustment coefficient ALPHA is 0.5.

Here, the polygonal line generated to correspond to the adjustment value $GA(i)$ which monotonically decreases, the positive adjustment coefficient ALPHA, and the positive magnifying values APLEFFECT has a shape of upward convex.

Since the contrast in the low luminance range is expanded and the contrast in the high luminance range is compressed, by correcting the luminance value according to the gain characteristics having the shape of upward convex, the gradation representation of a dark area perceived by a viewer is improved, contributing to prevention of black crushing. The degree of expanding or compressing the contrast for each of the luminance sections; that is, the amount of correction of the luminance value is adjustably controlled according to the degree of meandering of the shape of the polygonal line representing the gain characteristics.

In the average luminance adaptive gradation correction, gain characteristics having the upward convex shape with large amount of protrusion is used according to a greater adjustment coefficient ALPHA with a decreased average luminance APL according to the above-described unique expression, the contrast in the low luminance range is expanded to a great degree and the contrast in the high luminance range is compressed to a great degree. With increased average luminance APL, the adjustment coefficient ALPHA decreases, the gain characteristics gradually become linear, and the degree of expanding and compressing the contrast decreases.

When the average luminance APL is greater than APL0, the adjustment coefficient ALPHA may take a negative value and thereby gain characteristics having the downward convex shape may be used. In this case, the contrast in the low luminance range is compressed, and the contrast in the high luminance range is expanded.

Such adjustment according to the average luminance APL is further adjusted according to the magnifying value APLEFFECT. For that reason, only by changing the magnifying value APLEFFECT that is specified, it is possible to perform gradation correction integrally with an extensive and adjustable amount of correction to cover from an amount of correction appropriate for a viewer having normal eyesight to an amount of correction appropriate for a viewer with a low vision.

It should be noted that the above-described histogram adaptive gradation correction and average luminance adaptive gradation correction may be performed in combination as described below, for example.

A polygonal line having a gradient of $(1+(HIST(i)/HIST\_AVE-1) \times HISTEFFECT+(GA(i)-1) \times ALPHA \times APLEFFECT)$ in the i-th section is generated as gain characteristics representing correspondence between the pre-correction luminance value and the corrected luminance value, using the gradient of $(1+(HIST(i)/HIST\_AVE-1) \times HISTEFFECT)$ in the i-th section of the polygonal line generated in the gain characteristics generator 112 and the gradient of $(1+(GA(i)-1) \times ALPHA \times APLEFFECT)$ in the i-th section of the polygonal line generated in the gain characteristics generator 114. The luminance value is corrected according to the correspondence between the pre-correction luminance value and the corrected luminance value which are represented by the polygonal lines.

In this manner, it is possible to obtain an advantageous effect of expanding the contrast in a section having a luminance value having a great frequency and an advantageous effect of expanding the contrast in the low luminance range according to the average luminance APL, to the degree according to the magnifying value HISTEFFECT and to the degree according to the magnifying value APLEFFECT, respectively.

Figure 7:
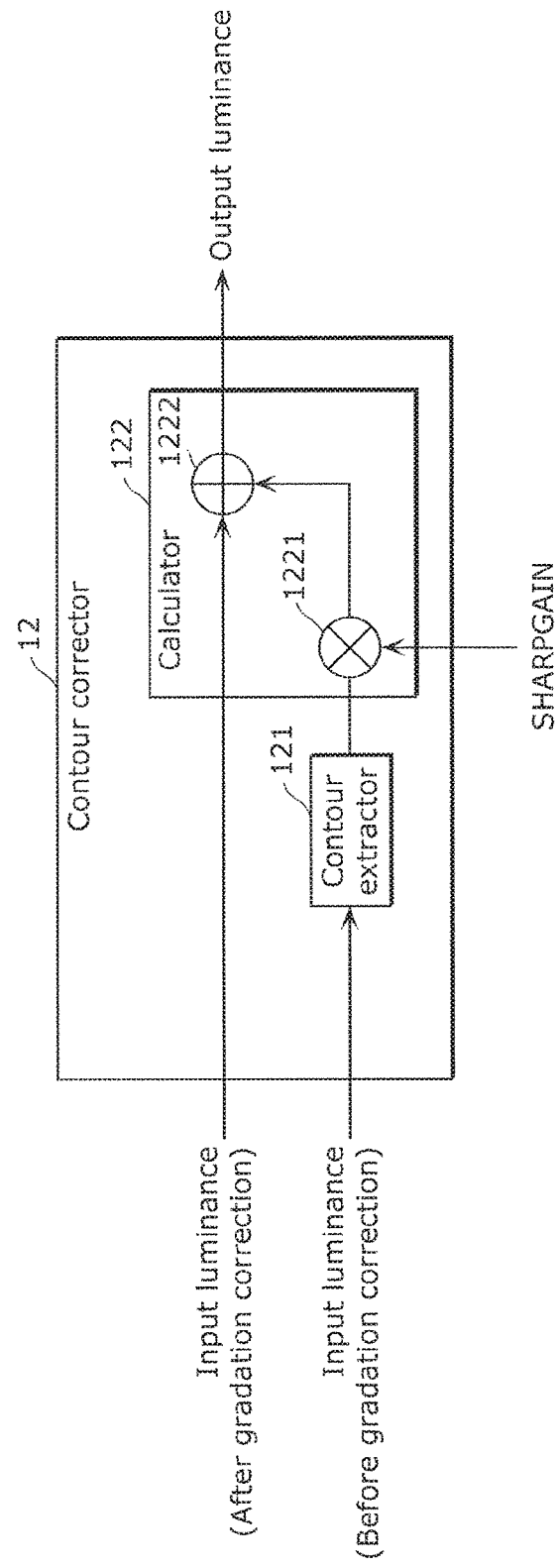
FIG. 7 is a block diagram which illustrates an example of a functional configuration of a contour corrector according to Embodiment 1.

FIG. 7 is a block diagram which illustrates an example of a functional configuration of the contour corrector 12. The contour corrector 12 is a unit which performs the luminance contour correction. As illustrated in FIG. 7, the contour corrector 12 includes a contour extractor 121 and a calculator 122. The calculator 122 includes a multiplier 1221 and an adder 1222.

The following describes the luminance contour correction performed by the contour corrector 12.

Figure 8:
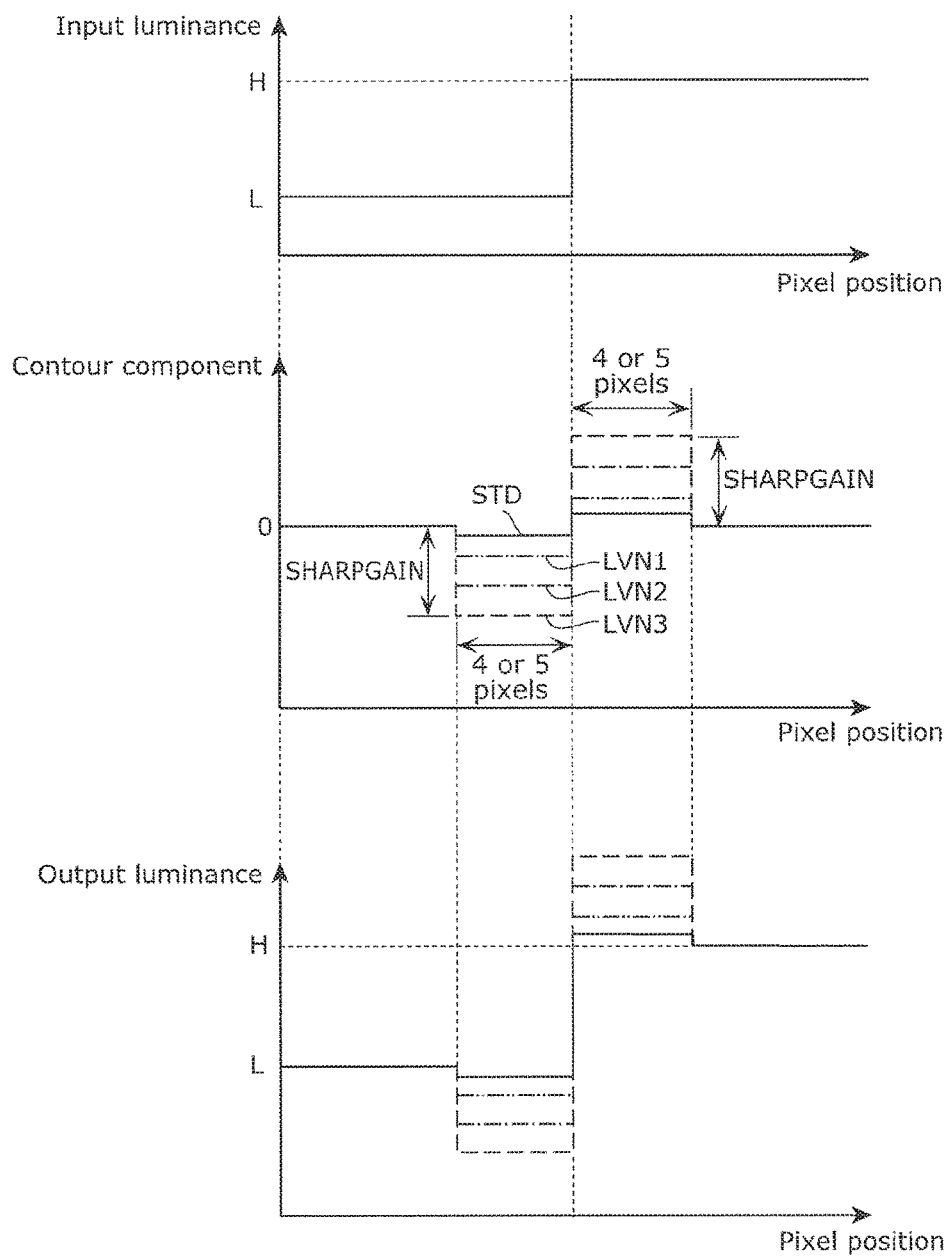
FIG. 8 is a diagram which illustrates an example of luminance contour correction according to Embodiment 1.

FIG. 8 is a diagram which illustrates an example of the luminance contour correction.

The contour extractor 121 obtains a luminance value before the gradation correction is performed, and extracts a contour component of a relatively low spatial frequency of a pixel width including approximately 4 or 5 pixels. It should be noted that, although a contour component is extracted from input luminance before the gradation correction is performed, as an example, the contour component need not be extracted from input luminance before the gradation correction is performed, and may be extracted, for example, from input luminance after the gradation correction is performed.

The calculator 122 receives a magnifying value SHARPGAIN which has been specified, and adds, using the adder 1222, the contour correction component obtained by multiplying the contour component by the magnifying value SHARPGAIN using the multiplier 1121, to a luminance value at a corresponding pixel position obtained before the gradation correction is performed, thereby calculating a corrected luminance value.

In the example illustrated in FIG. 8, the input luminance is shown at the top, the contour correction components STD, LVN1, LVN2, and LVN3 which are calculated to correspond to the magnifying values HISTEFFECT of 0.2, 0.5, 1.0, and 1.5, respectively are shown in the middle, and the output luminance obtained by adding the contour correction component to the input luminance is shown at the bottom. In the luminance contour correction, only by changing the magnifying value SHARPGAIN, it is possible to perform the luminance contour correction integrally with an extensive and adjustable amount of correction to cover from an amount of correction appropriate for a viewer having normal eyesight to an amount of correction appropriate for a viewer with a low vision.

Figure 9:
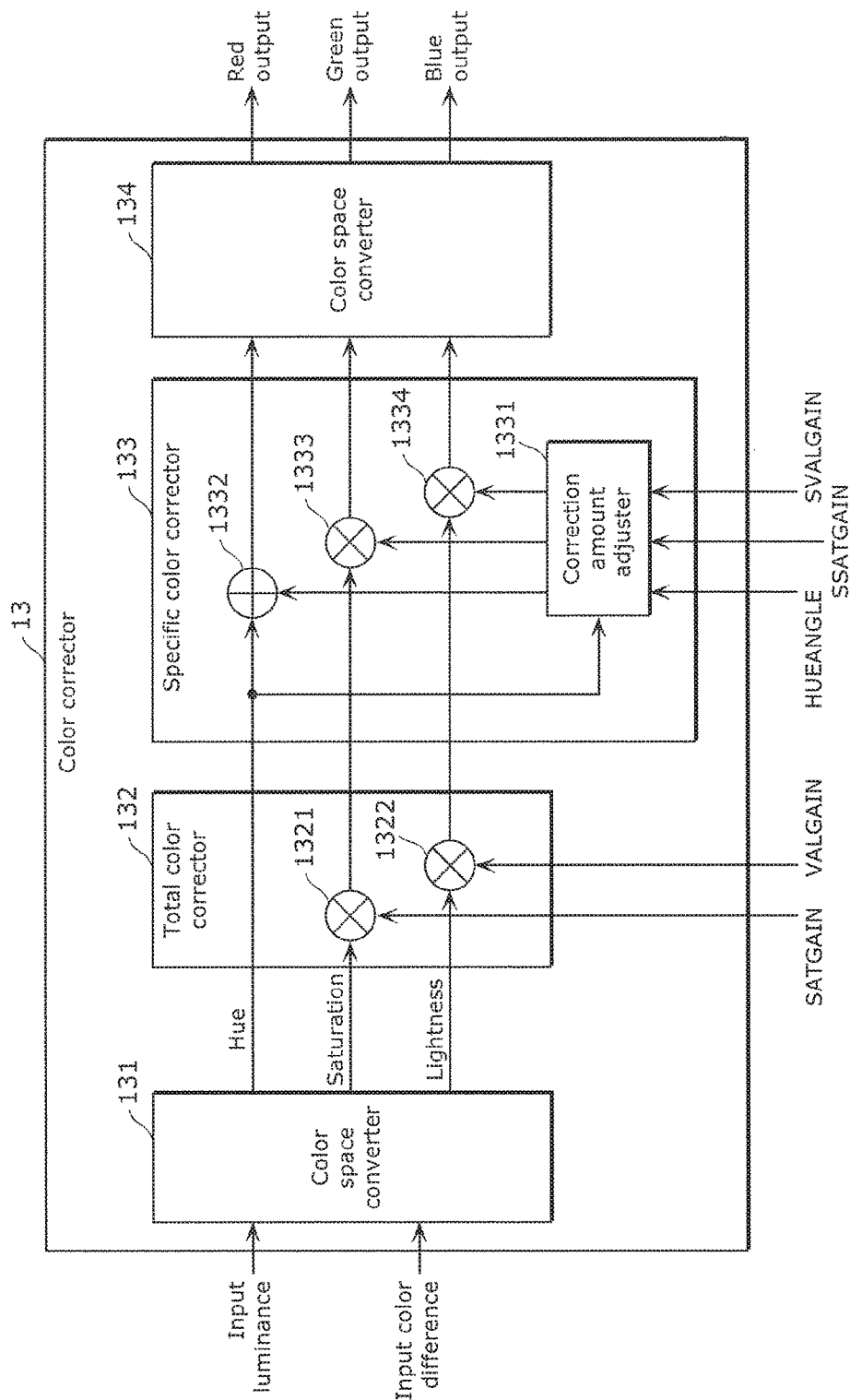
FIG. 9 is a block diagram which illustrates an example of a functional configuration of a color corrector according to Embodiment 1.

FIG. 9 is a block diagram which illustrates an example of a functional configuration of the color corrector 13. The color corrector 13 is a unit which performs at least one of the total color saturation correction, the total color lightness correction, the specific color hue correction, the specific color saturation correction, and the specific color lightness correction. As illustrated in FIG. 9, the color corrector 13 includes a color space converter 131, a total color corrector 132, a specific color corrector 133, and a color space converter 134. The total color corrector 132 includes multipliers 1321 and 1322. The specific color corrector 133 includes a correction amount adjuster 1331, an adder 1332, multipliers 1333 and 1334.

The color space converter 131 converts an input luminance value and an input color difference value into a hue value, a saturation value, and a lightness value.

The total color corrector 132 receives a magnifying value SATGAIN which has been specified, and multiplies a pre-correction saturation value by the magnifying value SATGAIN, thereby performing the total color saturation correction to calculate a corrected saturation value.

In addition, the total color corrector 132 receives a magnifying value VALGAIN which has been specified, and multiplies a pre-correction lightness value by the magnifying value VALGAIN using the multiplier 1322, thereby performing the total color lightness correction to calculate a corrected lightness value.

The specific color corrector 133 receives an angle value HUEANGLE which has been specified, and when a pre-correction hue value falls in a specific range, adds the angle value HUEANGLE to the pre-correction hue value using the adder 1132, thereby performing the specific color hue correction to calculate a corrected hue value.

In addition, the specific color corrector 133 receives a magnifying value SSATGAIN which has been specified, and when the pre-correction hue value falls in the specific range, multiplies a pre-correction saturation value by the magnifying value SSATGAIN using the multiplier 1333, thereby performing the specific color saturation correction to calculate a corrected saturation value.

Furthermore, the specific color corrector 133 receives a magnifying value SVALGAIN which has been specified, and when the pre-correction hue value falls in the specific range, multiplies a pre-correction lightness value by the magnifying value SVALGAIN using the multiplier 1334, thereby performing the specific color lightness correction to calculate a corrected lightness value.

The color space converter 134 converts the corrected hue value, the corrected saturation value, and the corrected lightness value into color component values of red, green, and blue.

The following describes the total color saturation correction, the total color lightness correction, the specific color hue correction, the specific color saturation correction, and the specific color lightness correction, which are performed by the color corrector 13.

Figure 10:
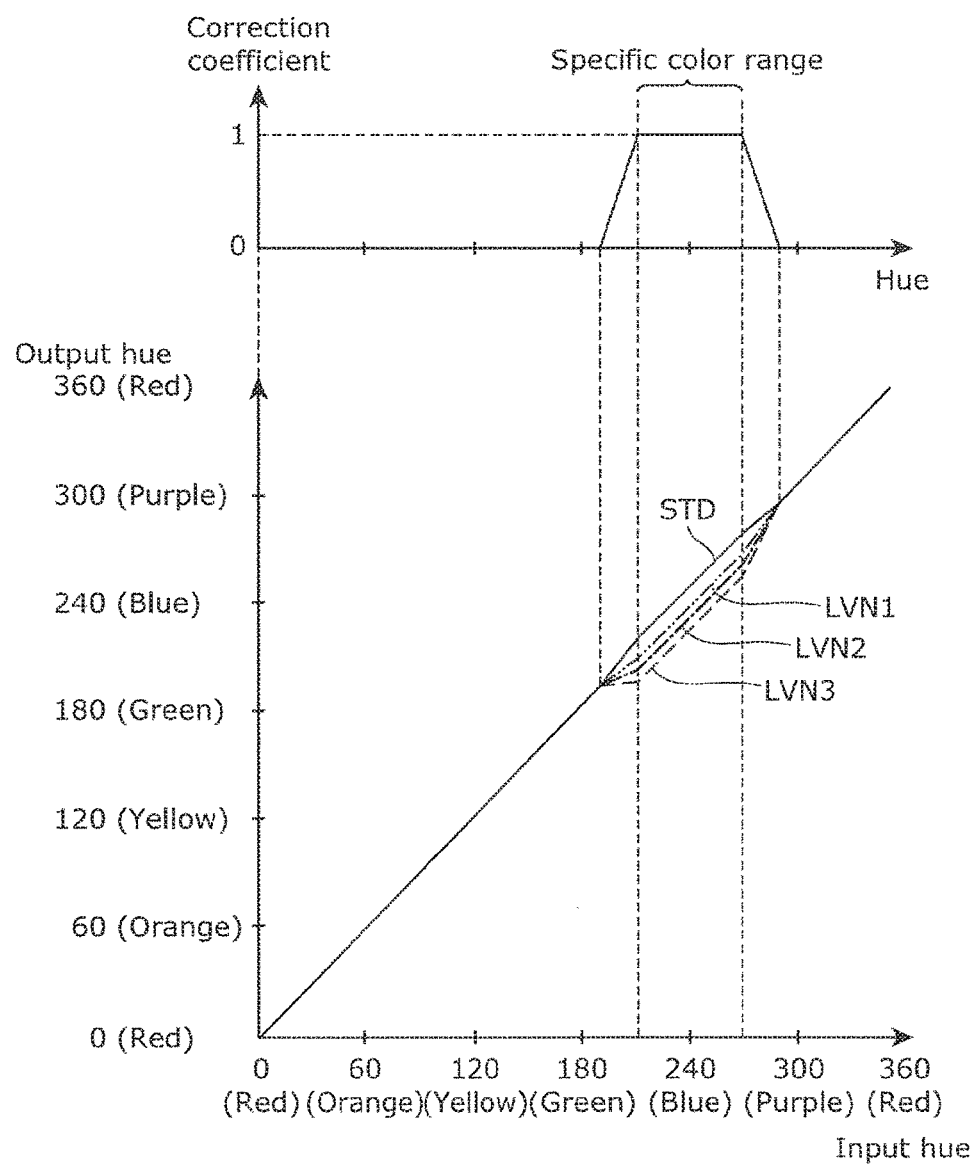
FIG. 10 is a diagram which illustrates an example of hue correction according to Embodiment 1.

FIG. 10 is a diagram which illustrates an example of the specific color hue correction. In FIG. 10, a range including a hue value representing blue is used as an example of the specific range.

As illustrated in FIG. 10, in the specific color corrector 133, the correction amount adjuster 1331 calculates a correction coefficient according to a pre-correction hue value. The correction coefficient takes a value 1 when the pre-correction hue value falls in the specific range, and takes a value which decreases from one to zero with a predetermined gradient as the pre-correction hue value is more distant from the specific range when the pre-correction hue value does not fall in the specific range. The correction amount adjuster 1331 calculates an adjusted angle value resulting from multiplying the calculated correction coefficient by the angle value HUEANGLE, and adds the adjusted angle value to the input hue using the adder 1332, thereby calculating the corrected hue value. When the pre-correction hue value falls in the specific range, as a result of the correction coefficient taking one, practically, a hue value obtained by adding the angle value HUEANGLE to the pre-correction hue value is calculated as a corrected hue value.

In the example illustrated in FIG. 10, output hues STD, LVN1, LVN2, and LVN3 which resulted from adding the adjusted angle value obtained by multiplying the angle value HUEANGLE by the correction coefficient to the input hues are illustrated, to correspond to the angle values HUEANGLE of 5 degrees, −10 degrees, −15 degrees, and −20 degrees.

According to the corrected output hue STD in the standard mode, as a result of a hue of a blue-type color being rotated in a direction of a purple color having a shorter wavelength, a corrected image in which the blue-type color is emphasized when viewed by a viewer having normal eyesight. However, such a corrected image is not necessarily be visually recognized as an image in which the blue-type color is emphasized when viewed by a viewer with low vision having a decreased visual sensitivity to a color having a short wavelength.

In contrast, according to the corrected output hues LVN1, LVN2, and LVN3 in the low vision mode, as a result of a hue of a blue-type color being rotated in a direction of a green color having a longer wavelength, a corrected image in which the blue-type color is easily visually recognized by a viewer with low vision. In addition, it is possible to provide improvement effect of an image quality obtained by correcting not a luminance value but a hue value, to a viewer with low vision who cannot sufficiently perceive improvement in the image quality as a result of correcting luminance of a specific color.

In the specific color hue correction, only by changing the angle value HUEANGLE, it is possible to perform the specific color hue correction integrally with an extensive and adjustable amount of correction to cover from an amount of correction appropriate for a viewer having normal eyesight to an amount of correction appropriate for a viewer with a low vision.

It should be noted that, depending on the gradient of the corrected coefficient, inverse movement of a hue in which the output hue value decreases as the input hue value increases might occur. The inverse movement of a hue might result in a causal factor of deterioration in an image quality, such as deterioration which is perceived as unnatural change in color tone in a gradation portion of an image, and thus a gentle gradient may be used for the gradient of the corrected coefficient, to the degree that does not cause the inverse movement of a hue.

Figure 11:
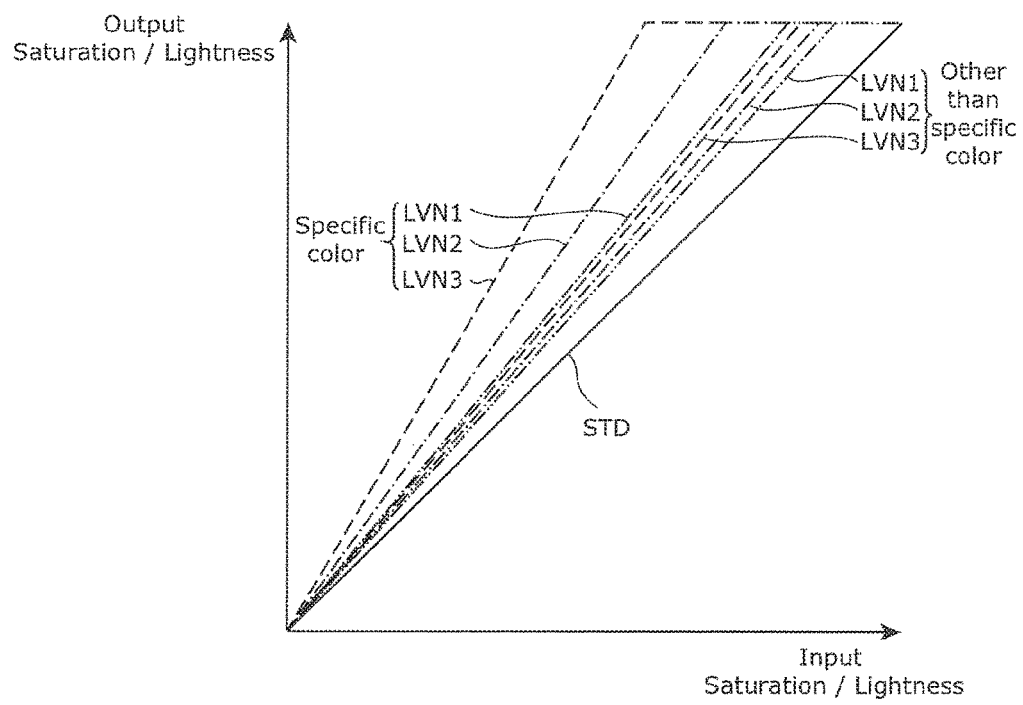
FIG. 11 is a diagram which illustrates an example of saturation correction and lightness correction according to Embodiment 1.

FIG. 11 is a diagram which illustrates an example of the total color saturation correction, the total color lightness correction, the specific color saturation correction, and the specific color lightness correction.

In the specific color saturation correction and the specific color lightness correction, the correction amount adjuster 1331 calculates an adjusted magnification, using the correction coefficient, the magnifying value SSATGAIN, and the magnifying value SVALGAIN. The adjusted magnification may be calculated according to, for example, (1−C)+C× SSATGAIN, and (1−C)+C×SVALGAIN, where C is the correction coefficient. The multiplier 1333 and the multiplier 1334 calculate the output saturation and the output lightness, respectively, by multiplying the input saturation and the input lightness by the adjusted magnification.

When the pre-correction hue value falls in the specific range, as a result of the correction coefficient taking one, practically, a saturation value obtained by multiplying the pre-correction saturation value by the magnifying value SSATGAIN is calculated as a corrected saturation value, and a lightness value obtained by multiplying the pre-correction lightness value by the magnifying value SVALGAIN is calculated as a corrected lightness value.

In the example illustrated in FIG. 11, output saturation STD, LVN1, LVN2, and LVN3 which are obtained by applying both of the total color saturation correction and the specific color saturation correction to the input saturation, to correspond to the magnifying values SATGAIN of 1.0, 1.1, 1.15, and 1.2 and the magnifying values SSATGAIN of 1.0, 1.1, 1.2, and 1.3.

According to such magnifying values, in the color corrector 13, practical correction is not performed on the corrected output saturation STD in the standard mode. On the corrected output saturation LVN1, LVN2, and LVN3 in the low vision mode, only the total color saturation correction is practically performed in a color other than a specific color (in particular, a color having a corrected coefficient that takes 0), and the specific color saturation correction in addition to the total color saturation correction is performed in the specific color.

In the total color saturation correction and the specific color saturation correction, only by changing the magnifying values SATGAIN and SSATGAIN, it is possible to perform the total color saturation correction and the specific color saturation correction integrally with an extensive and adjustable amount of correction to cover from an amount of correction appropriate for a viewer having normal eyesight to an amount of correction appropriate for a viewer with a low vision.

The same explanation holds true for the total color lightness correction and the specific color lightness correction. For example, output saturation STD, LVN1, LVN2, and LVN3 which are obtained by applying both of the total color lightness correction and the specific color lightness correction to the input lightness, to correspond to the magnifying values VALGAIN of 1.0, 1.1, 1.2, and 1.3 and the magnifying values SVALGAIN of 1.0, 1.1, 1.2, and 1.3, are represented as a graph having a shape substantially equivalent to the output saturation STD, LVN1, LVN2, and LVN3 which are illustrated in FIG. 11.

According to such magnifying values, in the color corrector 13, practical correction is not performed on the corrected output lightness STD in the standard mode. On the corrected output lightness LVN1, LVN2, and LVN3 in the low vision mode, only the total color lightness correction is practically performed in a color other than a specific color (in particular, a color having a corrected coefficient that takes 0), and the specific color lightness correction in addition to the total color lightness correction is performed in the specific color.

In the total color lightness correction and the specific color lightness correction, only by changing the magnifying value VALGAIN and the magnifying value SVALGAIN, it is possible to perform the total color lightness correction and the specific color lightness correction integrally with an extensive and adjustable amount of correction to cover from an amount of correction appropriate for a viewer having normal eyesight to an amount of correction appropriate for a viewer with a low vision.

In the same manner as the specific color hue correction, in the specific color saturation correction and the specific color lightness correction, the saturation and the lightness may be emphasized using a range including a hue value representing blue as the specific range. In this manner, it is possible to obtain a corrected image in which the blue-type color is easily visually recognized by a viewer with low vision whose visual sensitivity to the color having a short wavelength is decreased.

It should be noted that the correction coefficient used in the specific color saturation correction and the specific color lightness correction need not be the same as the correction coefficient used in the specific color hue correction. For example, correction coefficients which take a value 1 in different ranges of a hue value respectively in the specific color hue correction, the specific color saturation correction, and the specific color lightness correction. In this manner, it is possible to independently control the range of color which is a target of correction in each of the specific color hue correction, the specific color saturation correction, and the specific color lightness correction.

It should be noted that, although the specific color hue correction, the specific color saturation correction, and the specific color lightness correction are performed using the range including a hue value representing blue as the specific range in the above-described example, this is an example in effectively improving an image quality as perceived by a viewer with low vision whose eyesight is decreased in a range of a short wavelength, and is not intended to limit the specific range. The specific range of a hue value for performing the specific color hue correction, the specific color saturation correction, and the specific color lightness correction should be properly determined according to spectral characteristics of eyesight of an assumed viewer with low vision.

Figure 12:
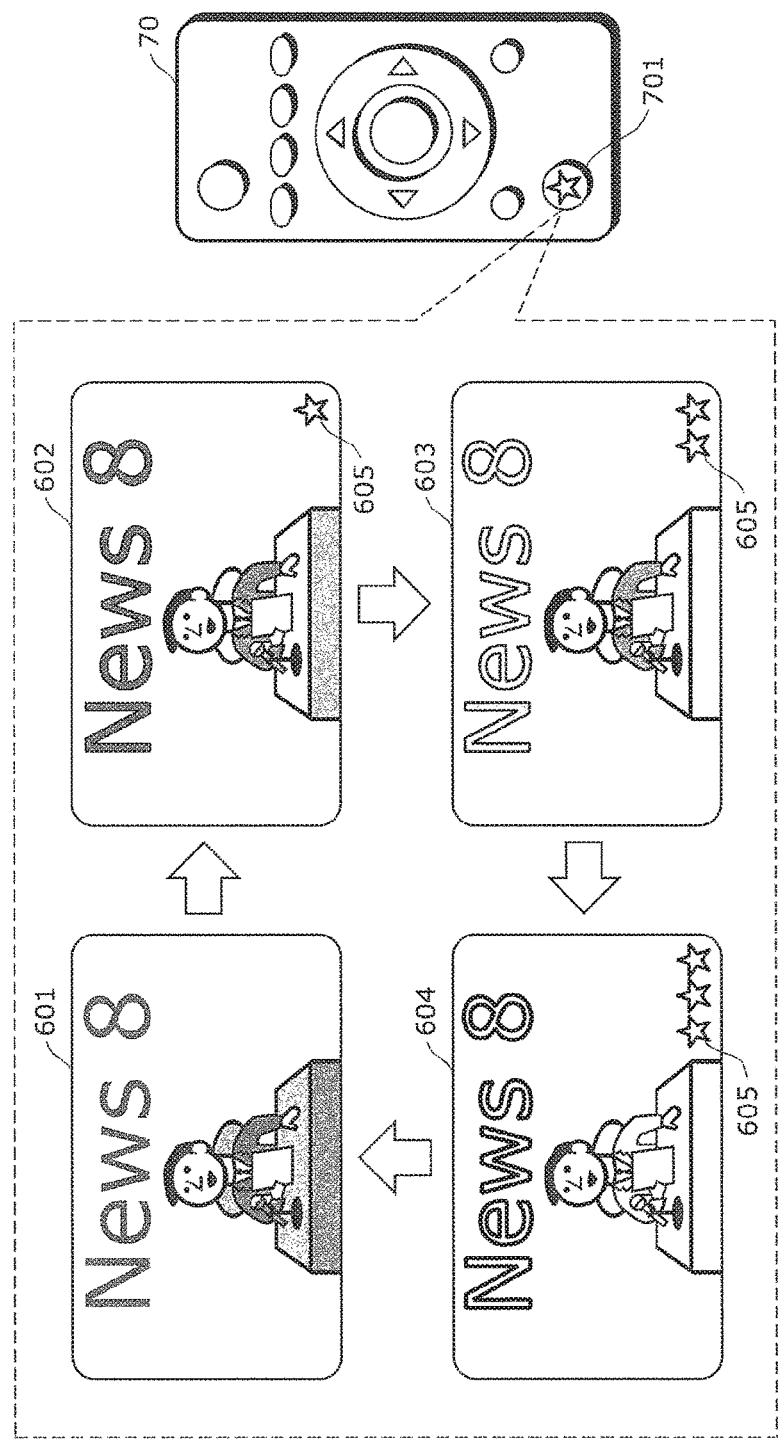
FIG. 12 is a diagram which illustrates an example of switching between correction modes according to Embodiment 1.

FIG. 12 is a diagram which illustrates an example of switching between correction modes.

The above-described correction mode may be cyclically switched between the standard mode, the low vision mode (weak), the low vision mode (middle), and the low vision mode (strong), in this order, by pressing a correction mode switching button 701 of a remote controller 70, for example. As illustrated in images 601, 602, 603, and 604, image correction is performed while increasing the level according to the correction mode.

A specific image or character 605 which indicates that correction in the low vision mode has been applied is combined with the images 601, 602, 603, and 604 to which correction has been performed in the low vision mode. The specific image or character 605 may be, for example, the number of starts representing the degree of correction as illustrated in FIG. 12, or may be, for example, characters such as "low vision mode" (not illustrated).

To combine such a specific image or character with the corrected image is effective in notifying a viewer having normal eyesight of that excessive emphasis which reduces an image quality is added as a result of performing correction in the low vision mode.

Embodiment 2

A digital television receiver according to Embodiment 2 is an example of a video content reproduction device which includes the image correction device described in Embodiment 1, and performs image correction appropriate for a viewer with low vision, using the image correction device, when reproducing a broadcast program that is video content to be broadcast using a digital broadcasting signal.

Figure 13:
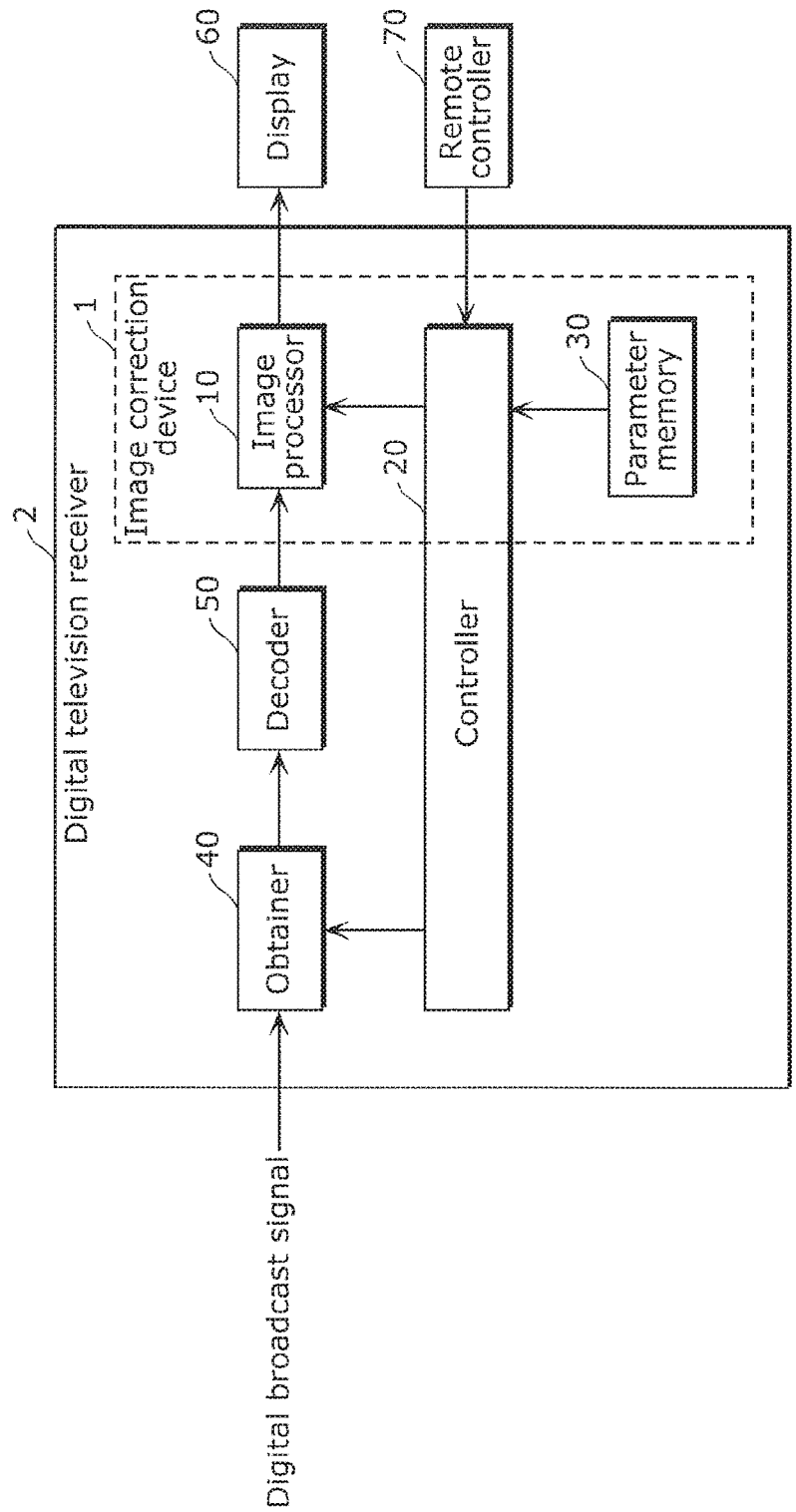
FIG. 13 is a block diagram which illustrates an example of a functional configuration of a digital television receiver according to Embodiment 2.

FIG. 13 is a block diagram which illustrates an example of a functional configuration of a digital television receiver 2 according to Embodiment 2. The digital television receiver 2 includes an obtainer 40 and a decoder 50 in addition to the image processor 10, the controller 20, and the parameter memory 30 included in the image correction device 1.

The obtainer 40 is configured of hardware such as a tuner and an orthogonal frequency division multiplexing (OFDM) demodulator, and obtains desired video content.

Decoder 50 is a decoder which decoders the video content into a plurality of images in time series, and may be configured of dedicated hardware which decodes the video content in accordance with the moving picture experts group (MPEG) standard, for example.

In the digital television receiver 2, the image correction device 1 generates a corrected image by adding excessive emphasis which reduces the image quality as perceived by a viewer having normal eyesight, to at least one of the luminance gradation, the luminance contour, and the color tone of a pre-correction image, using each of the images decoded from the video content as the pre-correction image.

The display 60 displays an image output from the digital television receiver 2.

The remote controller 70 receives, from a user, an instruction of selecting a channel or an instruction of selecting a correction mode and notifies the digital television receiver 2 of a signal indicating the received instruction.

The inventors brought the digital television receiver 2 configured as described above into an elderly facility, and conducted a field test in which an image quality in the low vision mode is evaluated by a plurality of elderly people, by comparing with an image quality in the standard mode.

Figure 14:
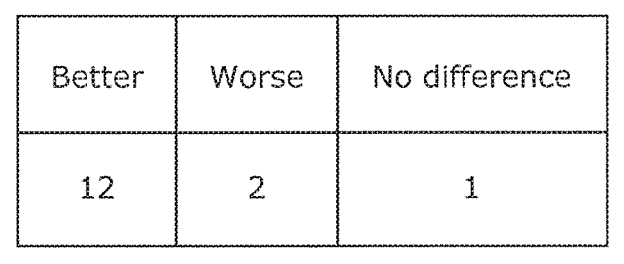

FIG. 14 is a diagram which illustrates an example of a result of the field test. FIG. 14 indicates a result obtained from 15 elderly people among 23 elderly people who visually compared the standard mode and the low vision mode, with the exception of 8 people who have difficulty in communication.

As illustrated in FIG. 14, 80% of the elderly people replied that the image quality in the low vision low vision is better than the image quality in the standard mode. Two people who replied that the image quality in the low vision mode is worse than the image quality in the standard mode commented on the image quality of in low vision mode that the brightness is too much, the color is too strong, the picture is too rough, and the contour is too much conspicuous.

These comments represent specific examples of excessive emphasis which reduces the image quality as perceived by a viewer having normal eyesight in the low vision mode, and thus it is considered that these two elderly people maintain relatively normal eyesight.

As a result, it is confirmed that the above-described image correction in the low vision mode is effective in improving the image quality for many elderly people.

Modification

The image correction device according to one or more aspects of the present disclosure has been described above based on the embodiments; however, the present disclosure is not limited to these embodiments. Other forms in which various modifications apparent to those skilled in the art are applied to the embodiments, or forms structured by combining structural elements of different embodiments may be included within the scope of the plurality of aspects, unless such changes and modifications depart from the scope of the present disclosure.

For example, there are instances in which eyesight of a central visual field is more largely decreased than eyesight of a peripheral visual field, according to the state of the low vision. In addition, there are the opposite instances. In order to perform image correction appropriate for a viewer with low vision in such a state, the corrected image may be generated, in the low vision mode, by correcting a portion of the pre-correction image using an amount of correction specified by the controller 20, and correcting the remainder of the pre-correction image using an amount of correction less than the amount of correction specified by the controller 20.

The following describes a configuration for performing the image correction in the low vision mode in a partial region in an image, using an example of the luminance contour correction.

Figure 15:
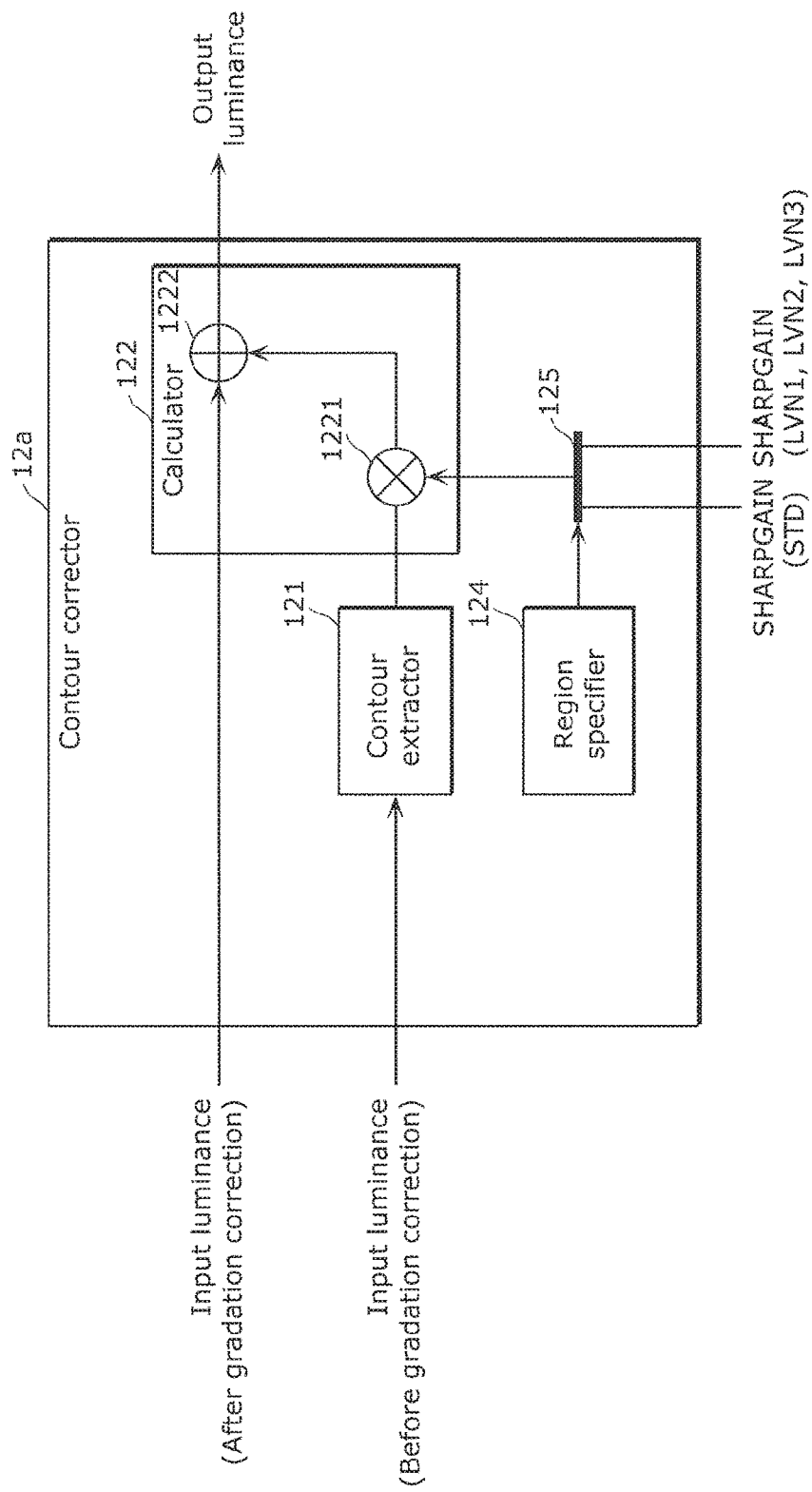
FIG. 15 is a block diagram which illustrates an example of a functional configuration of a contour corrector according to a modification example.

FIG. 15 is a block diagram which illustrates an example of a functional configuration of a contour corrector 12a according to a modification example. As illustrated in FIG.

15, the contour corrector 12a includes a region specifier 124 and a selector 125 in addition to the contour corrector 12 illustrated in FIG. 7.

The region specifier 124 outputs a signal for distinguishing between a region to which the amount of correction in the low vision mode should be applied and the other region.

The selector 125 selects, from the magnifying value SHARPGAIN (LVN1, LVN2, or LVN3) and the magnifying value SHARPGAIN (STD), one that corresponds to a signal from the region specifier 124, and supplies the multiplier 1221 with the selected magnifying value SHARPGAIN.

Here, the magnifying value SHARPGAIN (LVN1, LVN2, or LVN3) is an example of the amount of correction in the low vision mode, and the magnifying value SHARPGAIN (STD) is an example of the amount of correction in the standard mode and less than the amount of correction in the low vision mode.

According to the contour corrector 12a configured as described above, it is possible to perform image correction appropriate for a viewer with low vision who has decreased eyesight in part of a visual field.

In addition, although the digital television receiver has been described as an example of the video content reproduction device which includes the image correction device, the video content reproduction device which includes the image correction device is not limited to the digital television receiver. The above-described image correction device is included in any video content reproduction devices such as a DVD player, a blu-ray disk player, and a digital signage, and capable of performing image correction appropriate for a viewer with low vision.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is useful as an image correction device in any video content reproduction apparatuses, such as a digital television receiver, a DVD player, a blu-ray disk player, and a digital signage.

The invention claimed is:

1. An image correction device, which generates a corrected image for a viewer with low vision, by adding excessive emphasis which reduces image quality as perceived by a viewer having normal eyesight, to at least one of luminance gradation, luminance contour, and color tone of a pre-correction image,
the image correction device, comprising:
a controller which specifies, in a low vision mode which is an image correction mode for the viewer with low vision, a parameter that represents an amount of correction greater than an upper limit of an amount of correction which does not reduce the image quality as perceived by the viewer having normal eyesight when the pre-correction image is corrected; and
an image processor which generates the corrected image by correcting the at least one of the luminance gradation, the luminance contour, and the color tone of the pre-correction image with the amount of correction represented by the parameter,
wherein the image processor includes a gradation corrector which corrects the luminance gradation of the pre-correction image,
the gradation corrector includes:
a histogram detector which counts, in each of N sections obtained by dividing a range of a pre-correction luminance value related to luminance of a plurality of pixels included in the pre-correction image, a frequency HIST (i) which is the number of pixels each having the pre-correction luminance value included in an i-th section, N being ≥2, I being 1 to N;
a gain characteristics generator which receives a magnifying value HISTEFFECT which has been specified, and generates, using a value HIST_AVE which is an average value of the frequency HIST(i), a polygonal line having a gradient of (1+(HIST(i)/HIST_AVE−1)× HISTEFFECT) in the i-th section, as gain characteristics representing correspondence between the pre-correction luminance value and a corrected luminance value; and
a converter which converts the pre-correction luminance value into the corrected luminance value associated with the pre-correction luminance value according to the gain characteristics, and
the controller specifies, as the magnifying value HISTEFFECT, a value less than or equal to 0.05 in the standard mode, and a value greater than or equal to 0.2 in the low vision mode, to the gradation corrector.

2. The image correction device according to claim 1, wherein the controller selects one of the low vision mode and a standard mode which is an image correction mode for the viewer having normal eyesight, and specifies a parameter that represents an amount of correction equal to or less than the upper limit, in the standard mode.

3. A video content reproduction device, comprising:
an obtainer which obtains video content;
a decoder which decodes the video content into a plurality of images in time series, and
the image correction device according to claim 1, which generates a corrected image by adding excessive emphasis which reduces image quality as perceived by a viewer having normal eyesight, to at least one of luminance gradation, luminance contour, and color tone of each of the images decoded from the video content as a pre-correction image.

4. An image correction device, which generates a corrected image for a viewer with low vision, by adding excessive emphasis which reduces image quality as perceived by a viewer having normal eyesight, to at least one of luminance gradation, luminance contour, and color tone of a pre-correction image,
the image correction device, comprising:
a controller which specifies, in a low vision mode which is an image correction mode for the viewer with low vision, a parameter that represents an amount of correction greater than an upper limit of an amount of correction which does not reduce the image quality as perceived by the viewer having normal eyesight when the pre-correction image is corrected; and
an image processor which generates the corrected image by correcting the at least one of the luminance gradation, the luminance contour, and the color tone of the pre-correction image with the amount of correction represented by the parameter, wherein the image processor includes a gradation corrector which corrects the luminance gradation of the pre-correction image, the gradation corrector includes:

an average luminance detector which detects an average luminance APL of a pre-correction luminance value related to luminance of a plurality of pixels included in the pre-correction image;

a gain characteristics generator which receives a magnifying value APLEFFECT which has been specified, and generates a polygonal line, using: an adjustment value GA(i) for each of N sections obtained by dividing a range of the pre-correction luminance value; and an adjustment coefficient ALPHA represented by a function of the average luminance APL, the polygonal line having a gradient of (1+(GA(i)−1)×ALPHA×APLEFFECT) in an i-th section, as gain characteristics representing correspondence between the pre-correction luminance value and a corrected luminance value, N being ≥2, I being 1 to N, ΣGA(i) being N; and a converter which converts the pre-correction luminance value into the corrected luminance value associated with the pre-correction luminance value according to the gain characteristics, and the controller specifies, as the magnifying value APLEFFECT, a value less than or equal to 1.0 in the standard mode, and a value greater than or equal to 1.2 in the low vision mode, to the gradation corrector.

5. A video content reproduction device, comprising:

an obtainer which obtains video content;

a decoder which decodes the video content into a plurality of images in time series, and the image correction device according to claim 4, which generates a corrected image by adding excessive emphasis which reduces image quality as perceived by a viewer having normal eyesight, to at least one of luminance gradation, luminance contour, and color tone of each of the images decoded from the video content as a pre-correction image.

6. The image correction device according to claim 4, wherein the controller selects one of the low vision mode and a standard mode which is an image correction mode for the viewer having normal eyesight, and specifies a parameter that represents an amount of correction equal to or less than the upper limit, in the standard mode.

7. An image correction device, which generates a corrected image for a viewer with low vision, by adding excessive emphasis which reduces image quality as perceived by a viewer having normal eyesight, to at least one of luminance gradation, luminance contour, and color tone of a pre-correction image, the image correction device, comprising:

a controller which specifies, in a low vision mode which is an image correction mode for the viewer with low vision, a parameter that represents an amount of correction greater than an upper limit of an amount of correction which does not reduce the image quality as perceived by the viewer having normal eyesight when the pre-correction image is corrected; and an image processor which generates the corrected image by correcting the at least one of the luminance gradation, the luminance contour, and the color tone of the pre-correction image with the amount of correction represented by the parameter, wherein the image processor includes a contour corrector which corrects the luminance contour of the pre-correction image, the contour corrector includes:

a contour extractor which extracts a contour component related to luminance of the pre-correction image; and a calculator which receives a magnifying value SHARPGAIN which has been specified, and calculates a corrected luminance value by adding a contour correction component to a pre-correction luminance value related to luminance of a plurality of pixels included in the pre-correction image, the contour correction component being obtained by multiplying the contour component by the magnifying value SHARPGAIN, and the controller specifies, as the magnifying value SHARPGAIN, a value less than or equal to 0.2 in the standard mode, and a value greater than or equal to 0.5 in the low vision mode, to the contour corrector.

8. A video content reproduction device, comprising:

an obtainer which obtains video content;

a decoder which decodes the video content into a plurality of images in time series, and the image correction device according to claim 7, which generates a corrected image by adding excessive emphasis which reduces image quality as perceived by a viewer having normal eyesight, to at least one of luminance gradation, luminance contour, and color tone of each of the images decoded from the video content as a pre-correction image.

9. The image correction device according to claim 7, wherein the controller selects one of the low vision mode and a standard mode which is an image correction mode for the viewer having normal eyesight, and specifies a parameter that represents an amount of correction equal to or less than the upper limit, in the standard mode.

10. An image correction device, which generates a corrected image for a viewer with low vision, by adding excessive emphasis which reduces image quality as perceived by a viewer having normal eyesight, to at least one of luminance gradation, luminance contour, and color tone of a pre-correction image, the image correction device, comprising:

a controller which specifies, in a low vision mode which is an image correction mode for the viewer with low vision, a parameter that represents an amount of correction greater than an upper limit of an amount of correction which does not reduce the image quality as perceived by the viewer having normal eyesight when the pre-correction image is corrected; and an image processor which generates the corrected image by correcting the at least one of the luminance gradation, the luminance contour, and the color tone of the pre-correction image with the amount of correction represented by the parameter, wherein the image processor includes a color corrector which corrects the color tone of the pre-correction image, the color corrector includes a total color corrector which receives a magnifying value SATGAIN which has been specified, and calculates a corrected saturation value by multiplying, by the magnifying value SATGAIN, a pre-correction saturation value related to saturation of each of a plurality of pixels included in the pre-correction image, and the controller specifies, as the magnifying value SATGAIN, a value less than or equal to 1.0 in the standard mode, and a value greater than or equal to 1.1 in the low vision mode, to the total color corrector.

11. A video content reproduction device, comprising:
an obtainer which obtains video content;
a decoder which decodes the video content into a plurality of images in time series, and
the image correction device according to claim 10, which generates a corrected image by adding excessive emphasis which reduces image quality as perceived by a viewer having normal eyesight, to at least one of luminance gradation, luminance contour, and color tone of each of the images decoded from the video content as a pre-correction image.

12. The image correction device according to claim 10, wherein the controller selects one of the low vision mode and a standard mode which is an image correction mode for the viewer having normal eyesight, and specifies a parameter that represents an amount of correction equal to or less than the upper limit, in the standard mode.

13. An image correction device, which generates a corrected image for a viewer with low vision, by adding excessive emphasis which reduces image quality as perceived by a viewer having normal eyesight, to at least one of luminance gradation, luminance contour, and color tone of a pre-correction image,
the image correction device, comprising:
a controller which specifies, in a low vision mode which is an image correction mode for the viewer with low vision, a parameter that represents an amount of correction greater than an upper limit of an amount of correction which does not reduce the image quality as perceived by the viewer having normal eyesight when the pre-correction image is corrected; and
an image processor which generates the corrected image by correcting the at least one of the luminance gradation, the luminance contour, and the color tone of the pre-correction image with the amount of correction represented by the parameter,
wherein the image processor includes a color corrector which corrects the color tone of the pre-correction image,
the color corrector includes
a total color corrector which receives a magnifying value VALGAIN which has been specified, and calculates a corrected lightness value by multiplying, by the magnifying value VALGAIN, a pre-correction lightness value related to lightness of each of a plurality of pixels included in the pre-correction image, and
the controller specifies, as the magnifying value VALGAIN, a value less than or equal to 1.0 in the standard mode, and a value greater than or equal to 1.1 in the low vision mode, to the total color corrector.

14. A video content reproduction device, comprising:
an obtainer which obtains video content;
a decoder which decodes the video content into a plurality of images in time series, and
the image correction device according to claim 13, which generates a corrected image by adding excessive emphasis which reduces image quality as perceived by a viewer having normal eyesight, to at least one of luminance gradation, luminance contour, and color tone of each of the images decoded from the video content as a pre-correction image.

15. The image correction device according to claim 13, wherein the controller selects one of the low vision mode and a standard mode which is an image correction mode for the viewer having normal eyesight, and specifies a parameter that represents an amount of correction equal to or less than the upper limit, in the standard mode.

16. An image correction device, which generates a corrected image for a viewer with low vision, by adding excessive emphasis which reduces image quality as perceived by a viewer having normal eyesight, to at least one of luminance gradation, luminance contour, and color tone of a pre-correction image,
the image correction device, comprising:
a controller which specifies, in a low vision mode which is an image correction mode for the viewer with low vision, a parameter that represents an amount of correction greater than an upper limit of an amount of correction which does not reduce the image quality as perceived by the viewer having normal eyesight when the pre-correction image is corrected; and
an image processor which generates the corrected image by correcting the at least one of the luminance gradation, the luminance contour, and the color tone of the pre-correction image with the amount of correction represented by the parameter,
wherein the image processor includes a color corrector which corrects the color tone of the pre-correction image,
the color corrector includes
a specific color corrector which receives an angle value HUEANGLE which has been specified, and calculates, for each of a plurality of pixels included in the pre-correction image, a corrected hue value by adding the angle value HUEANGLE to a pre-correction hue value related to a hue of each of the pixels when the pre-correction hue value falls in a specific range, and
the controller specifies, as the angle value HUEANGLE, a value less than or equal to 5 degrees in an absolute value in the standard mode, and a value greater than or equal to 10 degrees in an absolute value in the low vision mode, to the specific color corrector.

17. A video content reproduction device, comprising:
an obtainer which obtains video content;
a decoder which decodes the video content into a plurality of images in time series, and
the image correction device according to claim 16, which generates a corrected image by adding excessive emphasis which reduces image quality as perceived by a viewer having normal eyesight, to at least one of luminance gradation, luminance contour, and color tone of each of the images decoded from the video content as a pre-correction image.

18. The image correction device according to claim 16, wherein the controller selects one of the low vision mode and a standard mode which is an image correction mode for the viewer having normal eyesight, and specifies a parameter that represents an amount of correction equal to or less than the upper limit, in the standard mode.

19. An image correction device, which generates a corrected image for a viewer with low vision, by adding excessive emphasis which reduces image quality as perceived by a viewer having normal eyesight, to at least one of luminance gradation, luminance contour, and color tone of a pre-correction image,
the image correction device, comprising:
a controller which specifies, in a low vision mode which is an image correction mode for the viewer with low vision, a parameter that represents an amount of correction greater than an upper limit of an amount of correction which does not reduce the image quality as perceived by the viewer having normal eyesight when the pre-correction image is corrected; and an image processor which generates the corrected image by correcting the at least one of the luminance gradation, the luminance contour, and the color tone of the pre-correction image with the amount of correction represented by the parameter, wherein the image processor includes a color corrector which corrects the color tone of the pre-correction image, the color corrector includes a specific color corrector which receives a magnifying value SSATGAIN which has been specified, and calculates, for each of a plurality of pixels included in the pre-correction image and each having a pre-correction hue value that is related to a hue of the pixel and falls in a specific range, a corrected saturation value by multiplying, by the magnifying value SSATGAIN, a pre-correction saturation value related to saturation of the pixel, and the controller specifies, as the magnifying value SSATGAIN, a value less than or equal to 1.0 in the standard mode, and a value greater than or equal to 1.1 in the low vision mode, to the specific color corrector.

20. A video content reproduction device, comprising:
an obtainer which obtains video content;
a decoder which decodes the video content into a plurality of images in time series, and
the image correction device according to claim 19, which generates a corrected image by adding excessive emphasis which reduces image quality as perceived by a viewer having normal eyesight, to at least one of luminance gradation, luminance contour, and color tone of each of the images decoded from the video content as a pre-correction image.

21. The image correction device according to claim 19, wherein the controller selects one of the low vision mode and a standard mode which is an image correction mode for the viewer having normal eyesight, and specifies a parameter that represents an amount of correction equal to or less than the upper limit, in the standard mode.

22. An image correction device, which generates a corrected image for a viewer with low vision, by adding excessive emphasis which reduces image quality as perceived by a viewer having normal eyesight, to at least one of luminance gradation, luminance contour, and color tone of a pre-correction image,
the image correction device, comprising:
a controller which specifies, in a low vision mode which is an image correction mode for the viewer with low vision, a parameter that represents an amount of correction greater than an upper limit of an amount of correction which does not reduce the image quality as perceived by the viewer having normal eyesight when the pre-correction image is corrected; and an image processor which generates the corrected image by correcting the at least one of the luminance gradation, the luminance contour, and the color tone of the pre-correction image with the amount of correction represented by the parameter, wherein the image processor includes a color corrector which corrects the color tone of the pre-correction image, the color corrector includes a specific color corrector which receives a magnifying value SVALGAIN which has been specified, and calculates, for each of a plurality of pixels included in the pre-correction image and each having a pre-correction hue value that is related to a hue of the pixel and falls in a specific range, a corrected lightness value by multiplying, by the magnifying value SVALGAIN, a pre-correction lightness value related to lightness of the pixel, and the controller specifies, as the magnifying value SVALGAIN, a value less than or equal to 1.0 in the standard mode, and a value greater than or equal to 1.1 in the low vision mode, to the specific color corrector.

23. A video content reproduction device, comprising:
an obtainer which obtains video content;
a decoder which decodes the video content into a plurality of images in time series, and
the image correction device according to claim 22, which generates a corrected image by adding excessive emphasis which reduces image quality as perceived by a viewer having normal eyesight, to at least one of luminance gradation, luminance contour, and color tone of each of the images decoded from the video content as a pre-correction image.

24. The image correction device according to claim 22, wherein the controller selects one of the low vision mode and a standard mode which is an image correction mode for the viewer having normal eyesight, and specifies a parameter that represents an amount of correction equal to or less than the upper limit, in the standard mode.

* * * * *